United States Patent
Oshio

(10) Patent No.: US 6,740,262 B2
(45) Date of Patent: May 25, 2004

(54) LIGHT-TRANSMITTING SINTERED BODY, LIGHT-EMITTING TUBE AND ELECTRIC DISCHARGE LAMP USING SAME

(75) Inventor: Shozo Oshio, Osaka-fu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 12 days.

(21) Appl. No.: 09/850,402

(22) Filed: May 8, 2001

(65) Prior Publication Data

US 2002/0032118 A1 Mar. 14, 2002

(30) Foreign Application Priority Data

May 9, 2000 (JP) ......................................... 2000-136194

(51) Int. Cl.[7] .............................. C04B 35/04; G02B 5/20
(52) U.S. Cl. ....................... 252/584; 501/120; 501/123; 501/125; 501/152; 501/153
(58) Field of Search ................................ 501/120, 123, 501/125, 152, 153; 252/582, 584

(56) References Cited

U.S. PATENT DOCUMENTS

| | | | |
|---|---|---|---|
| 3,767,745 A | | 10/1973 | Gazza et al. |
| 3,873,657 A | * | 3/1975 | Topa et al. .................. 501/152 |
| 3,905,845 A | * | 9/1975 | Kobayashi et al. .......... 501/152 |
| 4,174,973 A | * | 11/1979 | Rhodes et al. ............... 501/120 |
| 4,199,704 A | * | 4/1980 | Varshneya et al. ........... 501/120 |
| 4,204,874 A | * | 5/1980 | Yamada ........................ 501/152 |
| 4,285,732 A | * | 8/1981 | Charles et al. ............... 501/152 |
| 4,769,353 A | * | 9/1988 | Greskovich et al. ......... 501/152 |
| 5,587,346 A | * | 12/1996 | Zuk ............................... 501/152 |
| 5,631,201 A | * | 5/1997 | Wei et al. ..................... 501/152 |
| 6,339,118 B1 | * | 1/2002 | Yamashita et al. ........... 501/120 |
| 6,372,677 B1 | * | 4/2002 | Nose et al. ................... 501/120 |

FOREIGN PATENT DOCUMENTS

| | | |
|---|---|---|
| JP | 55-014757 | 2/1980 |
| JP | 5-120909 | 5/1993 |
| JP | 5-139862 | 6/1993 |
| JP | 5-221730 | 8/1993 |
| JP | 5-266861 | 10/1993 |
| JP | 5-286766 | 11/1993 |
| JP | 6-24828 | 2/1994 |
| JP | 6-56514 | 3/1994 |
| JP | 6-107456 | 4/1994 |
| JP | 6-171930 | 6/1994 |
| JP | 6-211569 | 8/1994 |
| JP | 7-309667 | 11/1995 |
| JP | 9-92206 | 4/1997 |
| JP | 11-147757 | 6/1999 |
| JP | 11-157933 | 6/1999 |

\* cited by examiner

*Primary Examiner*—Philip C. Tucker
(74) *Attorney, Agent, or Firm*—McDermott, Will & Emery

(57) ABSTRACT

A light-transmitting (fluorescent) sintered body formed of specific substances different from the prior art materials, solving problems that the performance or efficiency, uses and manufacturing methods are limited which have not been solved with the prior art light-transmitting sintered body and which provides a light-emitting tube and an electric discharge lamp using a light-transmitting (fluorescent) sintered body formed of the specific substance.

Provided are a light-transmitting sintered body mainly formed of a compound having a Mugnetplumbite structure or a β-alumina structure except for aluminum oxide, a light-transmitting sintered body mainly formed of a compound containing rare earth elements with an ionic valence of two, aluminum element and oxygen element as main components and an light-transmitting sintered body formed of mainly of a compound containing elements with an ionic valence of two except for rare earth elements, rare earth elements and oxygen element as main components.

9 Claims, 11 Drawing Sheets

(a)

(b)

◐ : 1
• : 3
○ : 4

● : 2
• : 3
○ : 4

● : 2
• : 3
○ : 4

LIGHT-TRANSMITTING SINTERED BODY, LIGHT-EMITTING TUBE AND ELECTRIC DISCHARGE LAMP USING SAME

BACKGROUND OF THE INVENTION

1. Field of the Invention

The present invention relates to a light-transmitting sintered body, light-emitting tube and electric discharge lamp using the same.

2. Prior Art

Sintered bodies represented by ceramics are not transparent and have been considered to be unsuitable as optical materials. In recent years, however, light-transmitting sintered bodies have been developed and used as light-transmitting materials with an excellent heat-resisting properties in such applications as light-emitting tube body, inspection windowpane for high temperature, optical lens, infrared windowpane, substrates for mounting functional devices, high voltage sodium lamps or electronic devices such as the light-emitting tube and the electric discharge lamp, optical memory, optical shutter, scintillator and solid laser.

The light-transmitting sintered bodies that have been known so far include $Al_2O_3$ sintered body (Japanese patent application laid open under No. 6-211569), ZnO sintered body (Japanese patent application laid open under No. 55-14757), PLZT sintered body (Japanese patent application laid open under No. 5-139862), $Y_3Al_5O_{12}$ sintered body (Japanese patent application laid open under No. 6-107456), $M_3Al_{15}O_{12}$ sintered body (M is at least one element selected from the group consisting of Er, Tm, Ho, Dy, Lu, Tb; Japanese patent application laid open under No. 11-147757), oxide sintered body containing sintered body containing $Al_{100-a}$ $M_a$—obtained by heating in oxygen or atmospheric air—as metallic element in the ceramics (M is one or more elements selected from the group consisting of Y, Ce, Nd, Sm, La, Gd, Pr; Japanese patent application laid open under No. 6-56514), $MgAl_2O_4$ sintered body (Japanese patent application laid open under No. 6-171930), AlON sintered body (Japanese patent application laid open under No. 7-309667), AlN sintered body (Japanese patent application laid open under No. 5-120909), cubic BN sintered body (Japanese patent application laid open under No. 5-221730), $Si_3N_4$ sintered body (Japanese patent application laid open under No. 5-286766), $BaF_2$ sintered body (Japanese patent application laid open under No. 6-24828), $Y_2O_3$ sintered body (Japanese patent application laid open under No. 11-157933), such sintered bodies as aluminum-type oxynitride, hafnium-type oxynitride, zirconium-type oxynitride, titanium-type oxynitride, zirconium-type nitride, hafnium-type nitride (Japanese patent application laid open under No. 9-92206).

In addition, the following light-transmitting sintered bodes are known: SiAlON sintered body, MgO sintered body, BeO sintered body, $Gd_2O_3$ sintered body, CaO sintered body, $ThO_2$ sintered body etc.

Also known are light-transmitting fluorescent in visible or ultraviolet region under an irradiation of ultraviolet light. Among them are $Y_3Al_5O_{12}$: $Tb^{3+}$ (U.S. Pat. No. 3,767,745) and $Y_2O_3$: $Gd^{3+}$ (G. Blasse and B. C. Grambaier; Luminescent Materials, Springer-Verlag, pp. 157–159).

It is understood that the light-transmitting sintered bodies mentioned above include the so-called light-transmitting ceramics.

The above-mentioned light-transmitting sintered bodies are obtained this way: a mixture of sintered body ingredient materials of an aluminum compound, rare earth elements, silicone compound etc. is pressure molded and well sintered by sintering means such as heating.

Furthermore, light-emitting tubes constructed of the above-mentioned light-transmitting sintered bodies and electric discharge lamps and illumination equipment using the light-emitting tubes are known (Japanese patent application laid open under No. 5-266861).

The light-emitting tube formed of the light-transmitting sintered bodies has an enclosure with a pair of electrodes therein which is sealed with inert gas, mercury, halogen gas or the like therein. In the light-emitting tube, a reduced pressure atmosphere or a high pressure atmosphere is maintained. The light-emitting tube made with the above-mentioned light-transmitting sintered bodies is superior to the prior art light-emitting tube made with silicon oxide in heat resistance and corrosion, and permits application of high power. By using the light-emitting tube, therefore, the electric discharge lamp can be raised in luminous flux and illumination equipment can be increased in quantity of light.

In addition, the light-transmitting fluorescent sintered body has a capability to convert ultraviolet rays into visible rays and, it is considered, can be applied as functional light-transmitting sintered body capable of raising the luminous flux emitted from the light-emitting tube by converting into visible rays the ultraviolet rays radiated within the light-emitting tube and capable of controlling the color rendering of the light emitted from the light-emitting tube.

In the prior art, as set forth above, the known materials that can be made into light-transmitting sintered bodies are only the substances with the following compounds as main components: $Al_2O_3$, ZnO, $Y_2O_3$, PLZT, $Y_3Al_5O_{12}$; the above-mentioned $M_3Al_{15}O_{12}$; oxides containing the above-mentioned $Al_{100-a}$ $M_a$—obtained by heating in oxygen or in the atmospheric air—as metallic element in the ceramics; $MgAl_2O_4$, AlON, AlN, cubic BN, $Si_3N_4$, $BaF_2$; aluminum-type nitride; hafnium-type nitride, zirconium-type nitride, titanium-type nitride, zirconium-type nitride, hafnium-type nitride; SiAlON, MgO, BeO, $Gd_2O_3$, CaO, $ThO_2$ etc.

The materials that can be used for the following articles are limited because the purposes of them are different and those articles have to be made with such limited kinds of materials. The articles include a variety of component parts manufactured with light-transmitting sintered bodes such as the light-emitting tube body, inspection windowpane for high temperature, optical lens, infrared windowpane, substrate for mounting functional elements and such electronic devices as the light-emitting tube, electric discharge lamp, optical memory, optical shutter and solid laser.

For this reason, it is impossible to fully meet the performance requirements demanded of those articles, and in addition the manufacturing method and applications are limited.

Furthermore, the light-emitting tubes using the prior art light-transmitting sintered bodies, especially one using $Y_3Al_5O_{12}$ light-transmitting sintered body presents this problem: the light emitting material (halide) sealed in the light-emitting tube undertakes a chemical reaction, lowering the light transmittance. And a light-emitting tube of a light-transmitting sintered body has been wanted which is made of a material different from the prior art.

Furthermore, the prior art light-emitting tube that makes up the electric discharge lamp and illumination equipment is formed of a non-fluorescent light-transmitting sintered body of non-fluorescent substance that does not emit light when irradiated with ultraviolet rays with a wave-length of not shorter than 100 nm and not longer than 380 nm. The ultraviolet rays that occur within the light-emitting tube merely radiate out and are not converted into visible rays, and therefore are low in luminous flux. Furthermore, even if a light-emitting tube is constructed with a light-transmitting fluorescent sintered body so that it can convert the ultraviolet rays into visible rays, the kinds of available light-transmitting fluorescent sintered bodies are quite limited in number and there is no suitable fluorescent material to choose, and the fluorescent colors of the light-emitting tube are limited to specific ones. The known light-transmitting fluorescent sintered bodies that emit light when irradiated with ultraviolet rays include only those based on $Y_3Al_5O_{12}$:$Tb^{3+}$ or $Y_2O_3$:$Gd^{3+}$. The light-emitting tube that is made of the light-transmitting fluorescent sintered body has not been put to practical use as general product for manufacturing and other reasons. $Y_3Al_5O_{12}$: $Tb^{3+}$, $Y_2O_3$: $Gd^{3+}$ etc. are relatively low in light emitting efficiency under irradiation with ultraviolet rays with a wave-length range from 140 to 280 nm, especially 147 nm, 185 nm, 254 nm. Even if component parts such as the light-emitting tubes using those light-transmitting fluorescent sintered bodies and a light-emitting tube are formed of a combination of the light-emitting tube body and ultraviolet ray source, or an electric discharge lamp is made using the light-emitting tube, no sufficient light emission is achieved.

For this reason, a light-transmitting fluorescent sintered body has been sought after which is formed of a light-transmitting fluorescent sintered body other than $Y_3Al_5O_{12}$: $Tb^{3+}$, $Y_2O_3$: $Gd^{3+}$ and which emit light with high efficiency under irradiation with ultraviolet rays with a wave-length of 140 to 280 nm.

In view of the disadvantages of the prior art, the inventors conducted intensive researches and found that specific substances other than the above-mentioned substances for the light-transmitting sintered body are suitable for forming a light-transmitting sintered body and a light-transmitting fluorescent sintered body as well. As a result, the present invention has been completed.

SUMMARY OF THE INVENTION

Accordingly, it is an object of the present invention to solve the problems with regard to efficiency or performance, uses, manufacturing process in which the prior art light-transmitting sintered bodies have failed and to provide a light-emitting tube using a light-transmitting sintered body and light-transmitting fluorescent sintered body formed of the above-mentioned specific substances and an electric discharge lamp using the same.

To accomplish the foregoing objects, the light-transmitting sintered body according to the present invention is formed as in the following.

That is, the light-transmitting sintered body according to the present invention is formed mainly of a compound having a magnetoplumbite structure or a compound having β-alumina structure except for aluminum oxide if viewed from an angle of the crystal structure. It is understood that hereinafter (II) indicates that the ionic valence is two while (III) indicates that the ionic valence is three.

The compounds having the magnetoplumbite structure or β-alumina structure include the following. (But the presence of the compounds in the form of light-transmitting sintered body is not known.)
(1) Compounds of the chemical formula $\alpha\delta\epsilon_{11}O_{19}$ (oxides; α represents at least one element selected from the group consisting of Sc, Y, La, Ce, Pr, Nd, Sm, Eu, Gd, Tb, Dy, Ho, Er, Tm, Yb, Lu, In, Tl, Sb, Bi; δ represents at least one element selected from the group consisting of Be, Mg, Mn, Zn; ε represents at least one element selected from the group consisting of B, Al, Ga, Sc, Fe (Japanese patent application laid open under No. 49-77893).
(2) Compounds of the chemical formula $\gamma\delta\epsilon_{10}O_{17}$ (oxides: γ represents at least one element selected from the group consisting of Li, Na, K, Rb, Ca, Sr, Ba, Eu (II), Sm (II), Yb (II), Dy (II), Pb; δ and ε are the same elements as δ and ε of the compounds of the above-mentioned chemical formula $\alpha\delta\epsilon_{11}O_{19}$ (Japanese patent application laid open under No. 49-77893).
(3) Compounds of the chemical formula $\alpha\delta\epsilon_{12}O_{18}N$ or $\gamma\epsilon_{11}O_{16}N$(oxynitride; α, γ, δ, ε represent the same elements as α, γ, δ, ε in the compounds of the as mentioned above chemical formula $\alpha\delta\epsilon_{11}O_{19}$ or $\gamma\delta\epsilon_{10}O_{17}$ (S. R. Jansen et al., J. Electrochemical So. Vol. 146 (1999) pp. 800–806).
(4) Compounds of the chemical formula $\gamma\epsilon_{12}O_{19}$ (oxides: γ, ε represent the same elements as γ, ε in the compounds of the as mentioned above chemical formula $\gamma\delta\epsilon_{10}O_{17}$) (J. L. Sommerdijk and A. L. N. Stevels, Philips Technical Review, 37 (1977) pp. 221–233 and the related references).

To be more concrete, the following examples are given:
(1) 1.29 (Ba, Ca)O. $6Al_2O_3$: $Eu^{2+}$ (BAL), $BaMgAl_{10}O_{17}$: $Eu^{2+}$ (BAM), $BaO.4Al_2O_3$: $Eu^{2+}$ (BAE), (Ce, Tb) $MgAl_{11}O_{19}$(CAT) (B. Smets et al., J. Electrochemical Soc. Vol. 1365 (1989) pp. 2119–2123), phosphor such as $BaAl_{11}O_{16}N$: $Eu^{2+}$ (Jansen et al., Electrochemical Soc. Vol. 146 (1999) pp. 800–806), $BaMgAl_{10}O_{17}$: $Mn^{2+}$, (Ba, Sr) $MgAl_{10}O_{17}$: $Eu^{2+}$, (Ba, Sr)$MgAl_{10}O_{17}$: $Mn^{2+}$, $CeMgAl_{11}O_{19}$: $Tb^{3+}$, $CeMgAl_{11}O_{19}$: $Tb^{3+}$, $CeMgAl_{11}O_{19}$: $Mn^{2+}$, $CeMgAl_{11}O_{19}$: $Mn^{2+}$, $CeAl_{12}O_{18}N$, $Tb^{3+}$ (phosphor handbook (Ohm publishing company) pp. 208–210).
(2) Host compounds as host for the above-mentioned phosphor, that is, 1.29 (Ba, Ca)O.$6A_{12}O_3$, $BaMgAl_{10}O_{17}$, $BaO.4A_2O_3$, $CeMgAl_{11}O_{19}$, $BaAl_{11}O_{16}N$, (Ba, Sr) $MgAl_{10}O_{17}$, $CeAl_{12}O_{18}N$.
(3) Compounds analogous to those ($SrMgAl_{10}O_{17}$, $CaMgAl_{10}O_{17}$, $MgAl_{12}O_{19}$, $CaAl_{12}O_{19}$, $SrAl_{12}O_{19}$, $EuAl_{12}O_{19}$, $LaMgAl_{11}O_{19}$, $PrMgAl_{11}O_{19}$, $EuMgAl_{11}O_{19}$, $TbMgAl_{11}O_{19}$, $GdMgAl_{11}O_{19}$, $MgAl_{11}O_{16}N$, $CaAl_{11}O_{16}N$, $SrAl_{11}O_{16}N$, $ScAl_{12}O_{18}N$, $PrAl_{12}O_{18}N$, $NdAl_{12}O_{18}N$, $DyAl_{12}O_{18}N$, $ErAl_{12}O_{18}N$ etc.)
(4) Compounds in which alkaline earth metallic elements in the above-mentioned phosphor, host compounds, analog compounds are substituted with rare earth elements with an ionic valence of two, alkaline elements or Pb; compounds in which rare earth elements with an ionic valence of three are substituted with In, Tl, Sb, Bi; compounds in which Al is substituted with Ga or Fe.

Compounds having the magnetoplumbite structure or compounds having a crystal structure, that is β-alumina structure except for aluminum oxide are preferably aluminum compounds and furthermore it is desirable that those compounds contain alkaline earth elements (that is, Be, Mg, Ca, Sr, Ba, Ra) as main component. In addition, it is desirable that those compounds are oxides.

However, all the light-transmitting sintered bodies according to the present invention are not compounds having the magnetoplumbite structure or β-alumina structure except for aluminum oxide.

Among the light-transmitting sintered bodies according to the present invention classified according to the component is a sintered body formed mainly of a compound containing rare earth elements with an ionic valence of two, aluminum element and oxygen element as main components. It is understood that the main components are elements that can be the above-mentioned compounds forming the light-transmitting sintered body and do not contain elements forming the so-called sintering auxiliaries.

The following compounds containing rare earth elements with an ionic valence of two, aluminum element and oxygen element as main components may be cited as examples (but as in the above-mentioned case, the presence of the compounds in the form of light-transmitting sintered body is not known). That is, the following compounds may be named:
Phosphor such as BAL, BAM, BAE, $BaAl_{11}O_{16}N$: $Eu^{2+}$;
In addition, bivalent rare earth elements ion-activated aluminate-type efficient phosphor activated with bivalent rare earth elements ions that emit fluorescence under irradiation with ultraviolet rays with a wave-length of 253.7 nm such as $2SrO.3Al_2O_3$: $Eu^{2+}$ (SAL), $4SrO.7Al_2O_3$: $Eu^{2+}$ (SAE), $BaAl_2O_4$: $Eu^{2+}$, $SrAl_2O_4$: $Eu^{2+}$, $Dy^{3+}$, $CaAl_2O_4$: $Eu^{2+}$, $Nd^{3+}$;
Compounds such as $Eu(II)Al_2O_4$, $Sm(II)Al_2O_4$, $Yb(II)Al_2O_4$, $Eu(II)4Al_{14}O_{25}$, $Sm(II)4Al_{14}O_{25}$, $Yb(II)Al_{14}O_{25}$, $Eu(II)MgAl_{10}O_{17}$, $Sm(II)Al_{12}O_{19}$, $Yb(II)Al_{11}O_{16}N$.
The above-mentioned bivalent rare earth elements ion represents at least one rare earth element ion selected from the group consisting of Eu (II), Sm (II), Yb (II), Dy (II).

It is noted that $SrAl_2O_4$: $Eu^{2+}$, $Dy^{3+}$ and $CaAl_2O_4$: $Eu^{2+}$, $Nd^{3+}$ bivalent rare earth elements ion activated aluminate-type efficient phosphor have attracted attention in recent years as fluorescent substance with a long afterglow time that lasts for more than several hours.

Furthermore, if the light-transmitting sintered bodies of the present invention are classified according to the components, the following can be cited: those formed mainly of a compound containing elements with an ionic valence of two except for rare earth elements, rare earth elements and oxygen element as main components.

The compounds containing elements with an ionic valence of two except for rare earth elements, rare earth elements and oxygen element as main components include the following (but as in the above case, the presence of those compounds in the form of light-transmitting sintered body is not known): the above-mentioned bivalent rare earth elements ion activated aluminate-type efficient phosphor, $MgY_2O_4$, $CaSm_2O_4$, $SrYb_2O_4$, $BaEu_2O_4$, $ZnLa_2O_4$ and other various compounds.

Light-transmitting sintered bodies formed of rare earth elements with an ionic valence of two, aluminum element, and oxygen element as main component or those formed of elements with an ionic valence of two except for the above-mentioned rare earth elements, rare earth elements and oxygen element are preferably made up mainly of compounds containing alkaline rare earth elements, and more preferably oxides.

However, all the light-transmitting sintered bodies according to the present invention are not included in the compounds containing the above-mentioned rare earth elements with an ionic valence of two, aluminum element, oxygen element or the compounds with an ionic valence of two except for rare earth elements, rare earth elements, oxygen element.

The light-transmitting sintered bodies according to the present invention or the compounds having a magnetoplumbite structure, if expressed in a composition formula, include those expressed in $\alpha_{(1)}\delta_{(1)} Al_xO_y$ where $\alpha_{(1)}$ represents at least one element selected from the group consisting of Sc, Y, La, Ce, Pr, Nd, Sm, Eu, Gd, Tb, Dy, Ho, Er, Tm, Yb, Lu and $\delta_{(1)}$ represents at least one element selected from the group consisting of Mg, Zn, Mn and where x has a value satisfying $5.5 \leq x \leq 22$, and y has a value satisfying $9.5 \leq y \leq 38$.

Furthermore, the light-transmitting sintered bodies according to the present invention or the compounds containing elements with an ionic valence of two except for rare earth elements, rare earth elements, oxygen element as main components, if expressed in a composition formula, include those expressed in $\gamma_{(2)}\delta_{(2)}Al_xO_y$ where $\gamma_{(2)}$, with an ionic valence of two expressed in (II), represents at least one element selected from the group consisting of Ca, Sr, Ba, Eu(II), Sm(II), Yb(II), Dy(II) and $\delta_{(2)}$ represents at least one element selected from the group consisting of Mg, Zn, Mn and where x has a value satisfying $5 \leq x \leq 20$, and y has a value satisfying $8.5 \leq y \leq 34$.

Still furthermore, the light-transmitting sintered bodies according to the present invention, if expressed in a different composition formula, include those based on a compound expressed in $\gamma_{(2)}Al_xO_y$ where $\gamma_{(2)}$, with the ionic valence of two expressed in (II), represents at least one element selected from the group consisting of Ca, Sr, Ba, Eu(II), Sm(II), Yb(II), Dy(II) and where x has a value satisfying $1 \leq x \leq 24$, and y has a value satisfying $2 \leq y \leq 38$.

Furthermore, the light-transmitting sintered bodies according to the present invention or the compounds containing elements with an ionic valence of two except for rare earth elements, rare earth elements, oxygen element as main components, if expressed in a composition formula, include those expressed in $\gamma_{(4)}\alpha_{(1)x}O_y$ where $\alpha_{(1)}$ represents at least one element selected from the group consisting of Sc, Y, La, Ce, Pr, Nd, Sm, Eu, Gd, Tb, Dy, Ho, Er, Tm, Yb, Lu where $\gamma_{(4)}$ represents at least one element selected from the group consisting of Mg, Ca, Sr, Ba, Zn and where x has a value satisfying $1 \leq x \leq 4$, and y has a value satisfying $2 \leq y \leq 8$.

Also, the light-transmitting sintered bodies according to the present invention include those so formulated as to contain metallic ions—rare earth elements, Mn, Pb, Tl etc.—that can be the luminescent center of the fluorescent substance. In this case, the electric discharge lamps (Xe electric discharge lamp, Ar+Hg electric discharge lamp etc.) as light source for illumination equipment emit ultraviolet rays with a wave-length of not shorter than 100 nm and not longer than 380 nm. To convert the ultraviolet rays into visible rays, it is preferable to make such a light-transmitting sintered body (light-transmitting fluorescent sintered body) that emits fluorescent light under irradiation with ultraviolet rays with a wave-length of not smaller than 100 nm and not larger than 380 nm. The light-transmitting sintered body according to the present invention may be formulated with a long afterglow fluorescent substance with long afterglow efficiency. The long afterglow efficient phosphor will be described later.

The light-transmitting sintered body according to the present invention can be made by the conventional method for making light-transmitting sintered bodies without difficulty. The method comprises the steps of:

Mixing a plurality of pulverized inorganic compounds with a purity of not lower than 99.9%;

Forming into a specific shade the mixture of the pulverized inorganic compounds after the mixing step or, furthermore, after preliminarily calcinating the pulverized inorganic compounds at not lower than 800° C. and not higher than 1,800° compound, preferably not lower than 1,000° C. and not higher than 1,600° C. following the mixing step;

After-calcinating(sintering) the formed body obtained after forming at not lower than 1,600° C. and not higher than 2,000° C., preferably not lower than 1,700° C. and not higher than 1,900° C. Other methods than that may be used.

The above temperature range is set that way because the melting point of the compounds forming the light-transmitting sintered body according to the present invention is not lower than 1500° C. and not higher than 2,200° C. In other words, it is desired that the temperature range for preliminary calcination is such that the pulverized inorganic compound materials become a mixture of chemically active compounds. That temperature range is not lower than 800° C. and not higher than 1,800° C., preferably not lower than 1,000° C. and not higher than 1,600° C. indicated above for preliminary calcination.

On the other hand, it is desirable that after-calcination is performed at a temperature not exceeding but close to the melting point in such a way that no impurities creep in and non-stoichiometric composition is not caused. For this reason, the temperature range is set at not lower than 1,600° C. and not higher than 2,000° C., preferably not lower than 1,700° C. and not higher than 1,900° C.

The atmosphere for the above-mentioned calcinations is selected mainly from the atmospheric air, nitrogen atmosphere, inert gas atmosphere, reduction atmosphere (atmosphere containing hydrogen gas, carbon monoxide atmosphere or vacuum atmosphere), these atmospheres being either reduced pressure atmospheres or vacuum atmospheres.

The light-emitting tube according to the present invention is formed using the above-mentioned light-transmitting sintered body at least in part. And the electric discharge lamp is constructed using that light-emitting tube.

BRIEF DESCRIPTION OF THE DRAWINGS

Having summarized the invention, a detailed description of the invention follows with reference being made to the accompanying drawings which form part of the specification, of which.

DESCRIPTION OF THE PREFERRED EMBODIMENTS

With reference to the attached drawings, the embodiments of the present invention will be explained to aid in the understanding of the present invention. It is understood that the following embodiments are exemplary of the present invention and limit the technical scope thereof.

Embodiment 1

The light-transmitting sintered bodies according to the present invention are formed mainly of the following compounds or components. For conveniences' sake, the light-transmitting sintered bodies are divided into a plurality of groups in the following description. Some of them belong not to a specific one group but to a plurality of groups.

First, the light-transmitting sintered bodies according to the present invention are classified by crystal structure, and one group of the light-transmitting sintered bodies having a magnetoplumbite structure is taken up.

Figure 1:
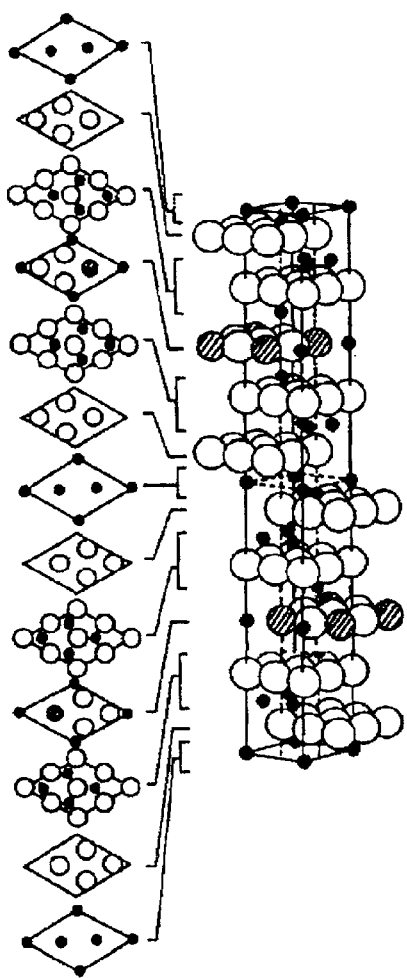
FIG. 1(a) and 1(b) shows the crystal structure of a compound having a magnetoplumbite structure and another compound having a β-alumina structure.
Figure 1:
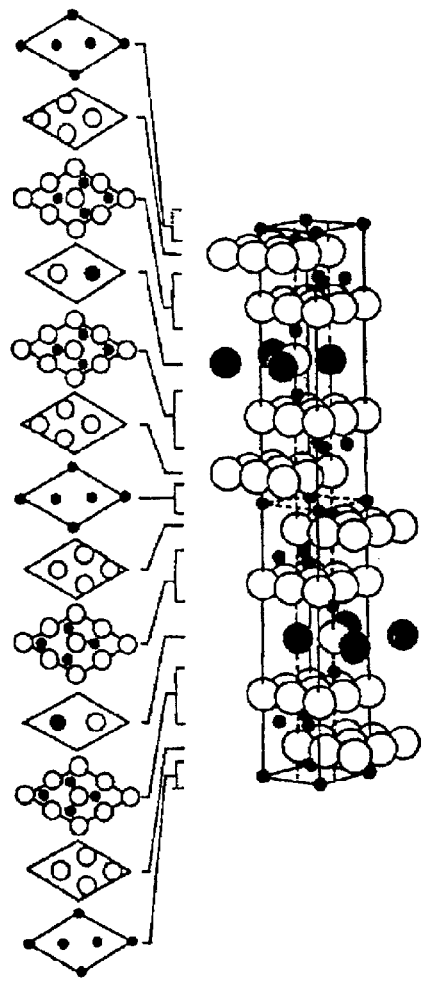

A schematic diagram of the magnetoplumbite structure is shown in FIG. 1(a). As shown in FIG. 1(a), the magnetoplumbite structure is a hexagonal system crystal structure having a strati-form crystal structure. In FIG. 1(a), the positive atom 1 is a trivalent or bivalent positive ion, the positive atom 3 is a bivalent or trivalent positive ion, and the negative atom 4 is a bivalent or trivalent negative ion.

In FIG. 1(a), the elements that can be the positive atom 1 include rare earth elements with a valence of two or three (Sc (III), Y (III), La (III), Ce (III), Pr (III), Nd (III), Sm (III), Eu (III), Gd (III), Tb (III), Dy (III), Ho (III), Er (III), Tm (III), Yb (III), Lu (III); they mean $Sc^{3+}$, $Y^{3+}$, $La^{3+}$, $Ce^{3+}$, $Pr^{3}+$, $Nd^{3}+$, $Sm^{3}+$, $Eu^{3+}$, $Gd^{3+}$, $Tb^{3+}$, $Dy^{3+}$, $Ho^{3+}$, $Er^{3}+$, $Tm^{3}+$, $Yb^{3+}$, $Lu^{3+}$, respectively), trivalent heavy metallic elements with a large ionic radius (In, Tl, Sb, Bi etc.), alkaline earth metals (Ca, Sr, Ba etc.).

It is noted that the more preferred positive atom 1 represents at least one atom selected from the group consisting of Y, La, Ce, Pr, Eu, Gd, Tb, Mg, Ca, Sr, Ba which readily form a compound with a good crystallizability. The most preferred positive atom 1 represents at least one element selected from the group consisting of Ce, Gd, Tb, Ca, Sr, Ba that have been used as practical fluorescent substance or practical fluorescent substance matrix.

The elements that can be the positive atom 3 include alkaline earth metals (Be, Mg, Ca, Sr, Ba etc.) and at least one atom selected from the group consisting of Mn, Zn, B, Al, Ga, In, Ti, Fe, Ru, Os, Sc, Y, La. The more preferred positive atom 3 is at least one atom selected from the group consisting of Mg, Zn, Mn, B, Al, Ga, Fe, Sc that readily form a compound with a good crystallizability or a compound that can assume a Mugnetplumbite structure because of its small ionic radius. The most preferred positive atom 3 represents at least one atom selected from the group consisting of Mg, Al because they are inexpensive.

Furthermore, the elements that can be the negative atom 4 are at least one atom selected from the group consisting of O, N, S, Se, P. The more preferred atom is at least one atom selected from the group consisting of O, N which are low in harmfulness and the most preferred negative atom 4 is O, a material which is inexpensive and readily available.

Hereinafter, unless otherwise noted, only the rare earth elements with an ionic valence of two will be indicated like this way: Eu (II), Sm (II), Yb (II), Dy (II). The rare earth elements with other ionic valences will be indicated like this: Sc, Y, La, Ce, Pr, Nd, Sm, Eu, Gd, Tb, Dy, Ho, Er, Tm, Yb, Lu. The following chemical formulae are examples of chemical formulae of compounds having the magnetoplumbite structure which will be the main components forming the light-transmitting sintered bodies according to the present invention.

$$\alpha_{(11)}\delta_{(11)}\epsilon_{(11)x1}O_{y1}$$

$$\alpha_{(11)}\epsilon_{(11)x2}O_{y2}N$$

$$\gamma_{(11)}\epsilon_{(11)x3}O_{y3}$$

(where $\alpha_{(11)}$ is at least one element selected from the group consisting of Sc, Y, La, Ce, Pr, Nd, Sm, Eu, Gd, Tb, Dy, Ho, Er, Tm, Yb, Lu, In, Tl, Sb, Bi; $\gamma$ represents at least one element selected from the group consisting of Mg, Ca, Sr, Ba, Ra, Eu(II), Sm(II), Yb(II), Dy (II), Pb; $\delta_{(11)}$ is at least one element selected from the group consisting of Be, Mg, Zn, Mn; $\epsilon_{(11)}$ represents at least one element selected from the group consisting of B, Al, Ga, Sc, Fe; O is an oxygen atom; N is a nitrogen atom; and x1 is a value satisfying $5.5 \leq x1 \leq 22$; y1 is a value satisfying $9.5 \leq y1 \leq 38$; x2 is a value satisfying $6 \leq x2 \leq 24$; y2 is a value satisfying $9 \leq y2 \leq 36$; x3 is a value satisfying $6 \leq x3 \leq 24$; y3 is a value satisfying $9.5 \leq y3 \leq 38$.

Single crystal phase compounds having only a magnetoplumbite structure can be obtained in a composition ratio of $\alpha_{(11)}\delta_{(11)}\epsilon_{(11)12}O_{18}$, or $\alpha_{(11)}\epsilon_{(11)12}O_{18}N$, or $\gamma_{(11)}\epsilon_{(11)12}O_{19}$, that is, x1=11, y1=19, x2=12, Y2=18, x3=12, y3=19. Compounds with the magnetoplumbite structure as main component (that is, compounds containing crystal phases other than the magnetoplumbite structure in small quantities, too) can be obtained within the numerically limited range of the above-mentioned values of x1, y1, x2, y2, x3, y3 and all the compounds can be light-transmitting sintered bodies.

For reference, typical compounds having the magnetoplumbite structure according to the present invention are enumerated in Table 1.

The names of phosphor, if any, corresponding to those compounds are given in Tables 1 to 5.

TABLE 1

| Composition formula of compounds | Composition formula of phosphor |
|---|---|
| $YMgAl_{11}O_{19}$ | |
| $LaMgAl_{11}O_{19}$ | |
| $CeMgAl_{11}O_{19}$ | |
| $PrMgAl_{11}O_{19}$ | |
| $EuMgAl_{11}O_{19}$ | |
| $TbMgAl_{11}O_{19}$ | |
| $GdMgAl_{11}O_{19}$ | |
| $TmMgAl_{11}O_{19}$ | |
| $(Y_{0.7}Ce_{0.3})MgAl_{11}O_{19}$ | |
| $(Pr_{0.7}Tb_{0.3})MgAl_{11}O_{19}$ | |
| $(La_{0.7}Eu_{0.3})MgAl_{11}O_{19}$ | |
| $(Gd_{0.7}Tb_{0.3})MgAl_{11}O_{19}$ | |
| $(Ce_{0.4}Tb_{0.3}Eu_{0.3})MgAl_{11}O_{19}$ | |
| $(Sc_{0.95}In_{0.05})MgAl_{11}O_{19}$ | |
| $(La_{0.95}Tl_{0.05})MgAl_{11}O_{19}$ | |
| $(Y_{0.95}Sb_{0.05})MgAl_{11}O_{19}$ | |
| $(Gd_{0.95}Bi_{0.05})MgAl_{11}O_{19}$ | |
| $Gd(Mg_{0.9}Mn_{0.1})Al_{11}O_{19}$ | |
| $CeMg(Al_{0.95}Ga_{0.05})_{11}O_{19}$ | |
| $GdMg(Al_{0.95}Fe_{0.05})_{11}O_{19}$ | |
| $(Gd_{0.7}Tb_{0.3})Mg(Al_{0.95}B_{0.05})_{11}O_{19}$ | |
| $(Ce_{0.7}Tb_{0.3})MgAl_{12}O_{18}N$ | |
| $DyMgAl_{12}O_{18}N$ | |

TABLE 1-continued

| Composition formula of compounds | Composition formula of phosphor |
|---|---|
| $ErMgAl_{12}O_{18}N$ | |
| $(Ce_{0.6}Tb_{0.4})MgAl_{11}O_{19}$ | $(CeMgAl_{11}O_{19}:Tb^{3+})$ |
| $(Ce_{0.6}Tb_{0.4})(Mg_{0.9}Mn_{0.1})Al_{11}O_{19}$ | $(CeMgAl_{11}O_{19}:Tb^{3+}, Mn^{2+})$ |
| $Ce(Mg_{0.9}Mn_{0.1})Al_{11}O_{19}$ | $(CeMgAl_{11}O_{19}:Mn^{2+})$ |
| $Ce(Mg_{0.85}Zn_{0.05}Mn_{0.1})Al_{11}O_{19}$ | $(Ce(Mg,Zn)Al_{11}O_{19}: Mn^{2+})$ |
| $(Ce_{0.6}Tb_{0.4})Al_{12}O_{18}N$ | $(CeAl_{12}O_{18}N:Tb^{3+})$ |
| $CaAl_{12}O_{19}$ | |
| $(Ca_{0.9}Ba_{0.1})Al_{12}O_{19}$ | |
| $SrAl_{12}O_{19}$ | |
| $Eu(II)Al_{12}O_{19}$ | |
| $PbAl_{12}O_{19}$ | |
| $(Pb_{0.6}Ca_{0.4})Al_{12}O_{19}$ | |
| $(Ca_{0.95}Na_{0.05})Al_{12-\alpha}O_{19-\beta}$ | |
| $CaMgAl_{11}O_{18.5}$ | |
| $(Sr_{0.9}Eu_{0.1})Al_{12}O_{19}$ | $(SrAl_{12}O_{19}:Eu^{2+})$ |
| $(Sr_{0.9}Sm_{0.1})Al_{12}O_{19}$ | $(SrAl_{12}O_{19}:Sm^{2+})$ |
| $(Sr_{0.9}Yb_{0.1})Al_{12}O_{19}$ | $(SrAl_{12}O_{19}:Yb^{2+})$ |

Furthermore, among the light-transmitting sintered bodies according to the present invention classified according to the crystal structure is a group formed mainly of the compounds having the β-alumina structure.

FIG. 1(b) is a schematic diagram of the β-alumina. The β-alumina structure is a hexagonal system crystal structure having a stratiform crystal structure like the magnetoplumbite structure shown in FIG. 1(a). In FIG. 1(b), the positive atom 3 and the negative atom 4 are the same as the respective atoms forming the magnetoplumbite structure. The positive atom 2 is an univalent or bivalent positive ion. The elements that can be the positive atom 2 include alkali metallic elements (Li, Na, K, Rb etc), alkaline earth metallic elements (Ca, Sr, Ba etc.), rare earth elements with an ionic valence of two (Eu(II), Sm(II), Yb(II), Dy(II); they mean $Eu^{2+}$, $Sm^{2+}$, $Yb^{2+}$, $Dy^{2+}$ respectively) and bivalent heavy metallic elements with a large ionic radius (Pb etc.).

The preferred positive atom 2 is at least one atom selected from the group consisting of alkali metals (Li, Na, K), alkaline earth metals (Mg, Ca, Sr, Ba), rare earth elements with an ionic valence of two (Sm(II), Eu(II), Yb(II), Dy(II)) which are not atoms that can be harmful ions (heavy metals, Be etc.). The more preferred positive atom 2 is at least one atom selected from the group consisting of Ca, Sr, Ba, Sm(II), Eu(II), Yb(II), Dy(II) which are relatively weak in ionicity and will not easily diffuse and does not deteriorate the life and performance of the light-emitting tube so much and which have a large ionic radius and tend to hold the β-alumina crystal structure. The most preferred positive atom 2 includes at least one element selected from the group consisting of Ca, Sr, Ba, Eu(II) which have been used as elements forming a high-efficient fluorescent substance.

The forms of the preferred positive atom 3 and negative atom 4 are the same as in the case of the magnetoplumbite structure explained earlier with reference to FIG. 1(a).

Figure 2:
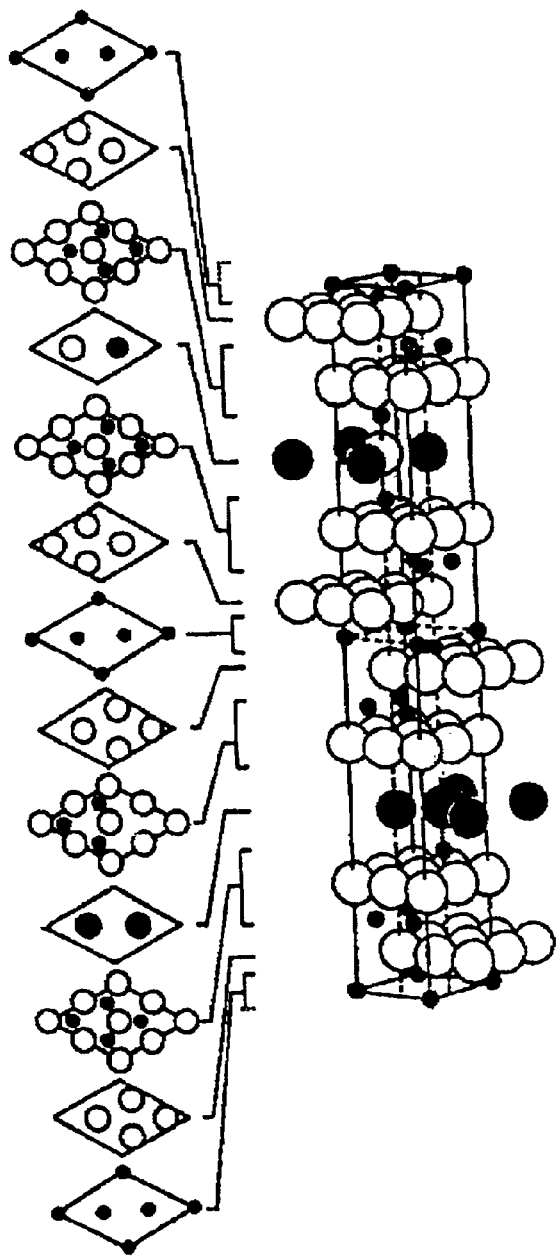
FIG. 2 shows a crystal structure of a β'-alumina structure.

There are also compounds that can assume a crystal structure called the β'-alumina as shown in FIG. 2 other than the β-alumina structure. The β'-alumina structure is similar to the β-alumina structure in crystal structure. As shown in FIG. 2, the positive atoms 2 in the β-alumina structure replace part of the negative atoms 4 and at the same time, part of the positive atoms 3 are missing in the crystal structure. The β-alumina structure contains more positive atoms 2 than the β'-alumina structure. But it is understood that in the description of the present specification the β-alumina includes the β'-alumina structure.

Among the compounds having the β'-alumina structure are the above-mentioned 1.29BaO.Al$_2$O$_3$, 1.29 (Ba, Eu)O.Al$_2$O$_3$ and 1.29 (Ba, Mn)O.Al$_2$O$_3$.

The following chemical formulae are examples of the chemical formulae of the compounds having the β-alumina structure except for aluminum oxide.

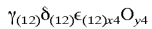

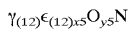

(where γ(12) represents at least one element selected from the group consisting of Li, Na, K, Rb, Cs, Fr, Be, Mg, Ca, Sr, Ba, Ra, Eu(II), Sm(II), Yb(II), Dy(II); $\delta_{(12)}$ is at least one element selected from the group consisting of Be, Mg, Zn, Mn; and $\epsilon_{(12)}$ represents at least one element selected from the group consisting of B, Al, Ga, Sc, Fe; O is an oxygen atom; N is a nitrogen atom; and where x4 is a value satisfying $5 \leq x4 \leq 20$; y4 is a value satisfying $8.5 \leq y4 \leq 34$; x5 is a value satisfying $5.5 \leq x5 \leq 22$; y5 is a value satisfying $8 \leq y5 = 32$.

It is noted that single crystal phase compounds having only the β-alumina structure are obtained with $\gamma_{(12)}\delta_{(12)}\epsilon_{(12)10}O_{17}$ or $\gamma_{(12)}\epsilon_{(12)11}O_{16}N$, that is, the composition ratio x4=10, y4=17, x5=11, y5=16. But the compounds with the β-alumina structure as main component (that is, the compounds containing small quantities of compounds having the crystal structure other than the β-alumina structure, too) can be obtain within the numerical limit of x4, y4, x5, y5. Any of them can be a light-transmitting sintered body.

For information, the compounds having the β-alumina structure according to the present invention are enumerated in Table 2.

TABLE 2

| Composition formula of compounds | Composition formula of phosphor |
|---|---|
| SrMgAl$_{10}$O$_{17}$ | |
| BaMgAl$_{10}$O$_{17}$ | |
| (Ba$_{0.5}$Sr$_{0.5}$)MgAl$_{10}$O$_{17}$ | |
| (Ba$_{0.5}$Sr$_{0.4}$Ca$_{0.1}$)MgAl$_{10}$O$_{17}$ | |
| (Ba$_{0.9}$Sm$_{0.1}$)MgAl$_{10}$O$_{17}$ | |
| (Ba$_{0.9}$Yb$_{0.1}$)MgAl$_{10}$O$_{17}$ | |
| (Ba$_{0.9}$Eu$_{0.1}$)MgAl$_{10}$O$_{17}$ | (BaMgAl$_{10}$O$_{17}$:Eu$^{2+}$) |
| (Ba$_{0.5}$Sr$_{0.4}$Eu$_{0.1}$)(Mg$_{0.9}$Mn$_{0.1}$)Al$_{10}$O$_{17}$ | ((Ba,Sr)MgAl$_{10}$O$_{17}$:Eu$^{2+}$, Mn$^{2+}$) |
| Eu(II)MgAl$_{10}$O$_{17}$ | |
| Ba(Mg$_{0.95}$Zn$_{0.05}$)Al$_{10}$O$_{17}$ | |
| BaMg(Al$_{0.95}$Ga$_{0.05}$)$_{10}$O$_{17}$ | |
| BaMg(Al$_{0.95}$B$_{0.05}$)$_{10}$O$_{17}$ | |
| BaAl$_{11}$O$_{18}$N | |
| SrAl$_{11}$O$_{18}$N | |
| (Ba$_{0.9}$Eu$_{0.1}$)Al$_{11}$O$_{18}$N | |
| Eu(II)Al$_{11}$O$_{18}$N | |
| 0.82BaO.6Al$_2$O$_3$ | |
| 0.82(Ba$_{0.9}$Eu$_{0.1}$)O.6Al$_2$O$_3$ | (0.82BaO.6Al$_2$O$_3$:Eu$^{2+}$) |
| 0.82(Ba$_{0.9}$Mn$_{0.1}$)O.6Al$_2$O$_3$ | (0.82BaO.6Al$_2$O$_3$:Mn$^{2+}$) |
| 1.29BaO.6Al$_2$O$_3$ | |
| 1.29(Ba$_{0.9}$Eu$_{0.1}$)O.6Al$_2$O$_3$ | (1.29BaO.6Al$_2$O$_3$:Eu$^{2+}$) |
| 1.29(Ba$_{0.9}$Mn$_{0.1}$)O.6Al$_2$O$_3$ | (1.29BaO.6Al$_2$O$_3$:Mn$^{2+}$) |

Next, among the light-transmitting sintered bodies according to the present invention classified according to the crystal structure is a group formed mainly of the compounds containing bivalent rare earth elements, aluminum element and oxygen element as main components.

Now, rare earth elements with an ionic valence of two will be explained additionally. The most stable valence of rare earth elements is trivalence. Therefore, if a compound containing rare earth elements or a mixture including a compound containing rare earth elements is heated in an oxidation atmosphere (in the atmospheric air etc.), a compound is generally formed in which the ionic valence of rare earth elements is mainly three.

To make a compound containing rare earth elements main with an ionic valence of, that is, a compound containing bivalent rare earth elements such as Eu(II), Sm(II), Yb(II) and Dy(II) and not containing trivalent rare earth elements such as Eu(III), Sm(III), Yb(III) and Dy(III), it is essential to heat in a reduction atmosphere (atmosphere containing hydrogen, carbon monoxide or the like) so as to lack oxygen necessary for those rare earth elements to keep trivalent and to facilitate formation of the ions of bivalent rare earth elements.

The following chemical formulae are samples of chemical formulae representing compounds containing rare earth elements mainly with an ionic valence of two or the main component forming the light-transmitting sintered bodies according to the present invention, aluminum element and oxygen element.

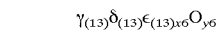

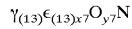

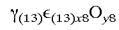

(where $\gamma_{(13)}$ contains at least one element—as main component—selected from the group consisting of Eu(II), Sm(II), Yb(II), Dy(II) and is at least one element selected from the group consisting of Li, Na, K, Rb, Cs, Fr, Be, Mg, Ca, Sr, Ba, Ra, Eu(II), Sm(II), Yb(II), Dy(II); $\delta_{(13)}$ represents at least one element selected from the group consisting of Be, Mg, Zn, Mn; $\epsilon_{(13)}$ contains at least Al as main component and represents at least one element selected from the group consisting of B, Al, Ga, Sc, Fe; O is an oxygen atom; N is a nitrogen atom; and where x6 is a value satisfying $5 \leq x6 \leq 20$; y6 is a value satisfying $8.5 \leq y6 \leq 34$; x7 is a value satisfying $5.5 \leq x7 \leq 22$; y7 is a value satisfying $8 \leq y7 \leq 32$; x8 is a value satisfying $1 \leq x8 \leq 24$; y8 is a value satisfying $8 \leq y8 \leq 32$.

It is noted that the compounds of the chemical formulae $\gamma_{(13)}\delta_{(13)}\epsilon_{(13)x6}O_{y6}$ and $\gamma_{(13)}\epsilon_{(13)x7}O_{y7}N$ are compounds having the β-alumina structure described above. The examples of the single crystal compounds of the chemical formula $\gamma_{(13)}\epsilon_{(13)x8}O_{y8}$ include SrAl$_2$O$_4$, Sr$_4$Al$_{14}$O$_{25}$, Sr$_2$Al$_6$O$_{11}$, BaAl$_8$O$_{13}$, and BaAl$_{12}$O$_{19}$. The compounds formed mainly of those compounds (that is, the above-mentioned compounds that contain small quantities of compounds other than those compounds, too) can be obtained within the numeral limited range of x8, y8, and any of them can be a light-transmitting sintered body.

For information, typical compounds containing rare earth elements with an ionic valence of two, aluminum element and oxygen element as main components are enumerated in Table 3.

TABLE 3

| Composition formula of compounds | Composition formula of phosphor |
|---|---|
| (Sr$_{0.9}$Eu$_{0.1}$)Al$_{12}$O$_{19}$ | (SrAl$_{12}$O$_{19}$:Eu$^{2+}$) |
| (Sr$_{0.9}$Sm$_{0.1}$)Al$_{12}$O$_{19}$ | (SrAl$_{12}$O$_{19}$:Sm$^{2+}$) |
| (Sr$_{0.9}$Yb$_{0.1}$)Al$_{12}$O$_{19}$ | (SrAl$_{12}$O$_{19}$:Yb$^{2+}$) |
| (Ba$_{0.9}$Sm$_{0.1}$)MgAl$_{10}$O$_{17}$ | |
| (Ba$_{0.9}$Yb$_{0.1}$)MgAl$_{10}$O$_{17}$ | |
| (Ba$_{0.9}$Eu$_{0.1}$)MgAl$_{10}$O$_{17}$ | (BaMgAl$_{10}$O$_{17}$:Eu$^{2+}$) |
| (Ba$_{0.5}$Sr$_{0.4}$Eu$_{0.1}$)(Mg$_{0.9}$Mn$_{0.1}$)Al$_{10}$O$_{17}$ | ((Ba,Sr)MgAl$_{10}$O$_{17}$:Eu$^{2+}$, Mn$^{2+}$) |
| Eu(II)MgAl$_{10}$O$_{17}$ | |
| (Ba$_{0.9}$Eu$_{0.1}$)Al$_{11}$O$_{18}$N | (BaAl$_{11}$O$_{18}$N:Eu$^{2+}$) |

TABLE 3-continued

| Composition formula of compounds | Composition formula of phosphor |
|---|---|
| Eu(II)Al$_{11}$O$_{18}$N | |
| 0.82(Ba$_{0.9}$Eu$_{0.1}$)O.6Al$_2$O$_3$ | (0.82BaO.6Al$_2$O$_3$:Eu$^{2+}$) |
| 1.29(Ba$_{0.9}$Eu$_{0.1}$)O.6Al$_2$O$_3$ | (1.29BaO.6Al$_2$O$_3$:Eu$^{2+}$) |
| (Ba$_{0.9}$Eu$_{0.1}$)O.4Al$_2$O$_3$ | (BaO.4Al$_2$O$_3$:Eu$^{2+}$) |
| 2(Sr$_{0.9}$Eu$_{0.1}$)O.3Al$_2$O$_3$ | (2SrO.3Al$_2$O$_3$:Eu$^{2+}$) |
| 4(Sr$_{0.9}$Eu$_{0.1}$)O.7Al$_2$O$_3$ | (4SrO.7Al$_2$O$_3$:Eu$^{2+}$) |
| (Ba$_{0.9}$Eu$_{0.1}$)Al$_2$O$_4$ | (BaAl$_2$O$_4$:Eu$^{2+}$) |
| (Sr$_{0.9}$Eu$_{0.097}$Dy$_{0.003}$)Al$_2$O$_4$ | (SrAl$_2$O$_4$:Eu$^{2+}$,Dy$^{3+}$) |
| (Ca$_{0.9}$Eu$_{0.097}$Nd$_{0.003}$)Al$_2$O$_4$ | (CaAl$_2$O$_4$:Eu$^{2+}$,Nd$^{3+}$) |
| Eu(II)Al$_2$O$_4$ | |
| Sm(II)Al$_2$O$_4$ | |
| Yb(II)Al$_2$O$_4$ | |
| Eu(II)$_4$Al$_{14}$O$_{25}$ | |
| Sm(II)$_4$Al$_{14}$O$_{25}$ | |
| Yb(II)$_4$Al$_{14}$O$_{25}$ | |
| Sm(II)Al$_{12}$O$_{19}$ | |
| Yb(II)Al$_{11}$O$_{16}$N | |

Also, the light-transmitting sintered bodies according to the present invention may be formed mainly of compounds of the composition formula $\gamma_{(14)}Al_xO_y$ (where $\gamma_{(14)}$ represents at least one element selected from the group consisting of Ca, Sr, Ba, Eu(II), Sm(II), Yb(II), Dy(II); x has a value satisfying $1 \leq x \leq 24$; y has a value satisfying $2 \leq y \leq 38$).

Among the compounds of the composition formula $\gamma Al_xO_y$ are BAL, BAE, 1.29(Ba, Ca)O.6Al$_2$O$_3$, BaO.4Al$_2$O$_3$, CaAl$_{12}$O$_{19}$, SrAl$_{12}$O$_{19}$, Eu(II)Al$_{12}$O$_{19}$, SAL, SAE, BaAl$_2$O$_4$: Eu$^{2+}$, SrAl$_2$O$_4$: Eu$^{2+}$, SrA$_{12}$O$_4$: Dy$^{3+}$, CaAl$_2$O$_4$: Eu$^{2+}$, CaAl$_2$O$_4$: Nd$^{3+}$, Eu(II)Al$_2$O$_4$, Sm(II)Al$_2$O$_4$, Yb(II)Al$_2$O$_4$, Eu(II)4Al$_{14}$O$_{25}$, Sm(II)4Al$_{14}$O$_{25}$, Yb(II)4Al$_{14}$O$_{25}$, Sm(II)Al$_{12}$O$_{19}$.

For information, the compounds of the chemical formula $\gamma_{(14)}Al_xO_y$ according to the present invention are enumerated in Table 4.

TABLE 4

| Composition formula of compounds | Composition formula of phosphor |
|---|---|
| CaAl$_{12}$O$_{19}$ | |
| SrAl$_{12}$O$_{19}$ | |
| (Ca$_{0.9}$Eu$_{0.1}$)Al$_{12}$O$_{19}$ | (CaAl$_{12}$O$_{19}$:Eu$^{2+}$) |
| (Sr$_{0.9}$Sm$_{0.1}$)Al$_{12}$O$_{19}$ | (SrAl$_{12}$O$_{19}$:Sm$^{2+}$) |
| (Ba$_{0.9}$Yb$_{0.1}$)Al$_{12}$O$_{19}$ | (BaAl$_{12}$O$_{19}$:Yb$^{2+}$) |
| 0.82BaO.6Al$_2$O$_3$ | |
| 0.82(Ba$_{0.9}$Eu$_{0.1}$)O.6Al$_2$O$_3$ | (0.82BaO.6Al$_2$O$_3$:Eu$^{2+}$) |
| 1.29BaO.6Al$_2$O$_3$ | |
| 1.29(Ba$_{0.9}$Eu$_{0.1}$)O.6Al$_2$O$_3$ | (1.29BaO.6Al$_2$O$_3$: Eu$^{2+}$) |
| BaO.4Al$_2$O$_3$ | |
| (Ba$_{0.9}$Eu$_{0.1}$)O.4Al$_2$O$_3$ | (BaO.4Al$_2$O$_3$:Eu$^{2+}$) |
| 2SrO.3Al$_2$O$_3$ | |
| 2(Sr$_{0.9}$Eu$_{0.1}$)O.3Al$_2$O$_3$ | (2SrO.3Al$_2$O$_3$:Eu$^{2+}$) |
| 4SrO.7Al$_2$O$_3$ | |
| 4(Sr$_{0.9}$Eu$_{0.1}$)O.7Al$_2$O$_3$ | (4SrO.7Al$_2$O$_3$:Eu$^{2+}$) |
| BaAl$_2$O$_4$ | |
| (Ba$_{0.9}$Eu$_{0.1}$)Al$_2$O$_4$ | (BaAl$_2$O$_4$:Eu$^{2+}$) |
| (Sr$_{0.5}$Ca$_{0.5}$)Al$_2$O$_4$ | |
| Eu(II)Al$_2$O$_4$ | |
| Sm(II)Al$_2$O$_4$ | |
| Dy(II)Al$_2$O$_4$ | |
| Yb(II)Al$_2$O$_4$ | |
| Eu(II)$_4$Al$_{14}$O$_{25}$ | |
| Sm(II)$_4$Al$_{14}$O$_{25}$ | |
| Yb(II)$_4$Al$_{14}$O$_{25}$ | |
| Sm(II)Al$_{12}$O$_{19}$ | |

Furthermore, among the light-transmitting sintered bodies according to the present invention classified according to the composition is a group formed mainly of the compounds containing elements with an ionic valence of two except for rare earth elements, rare earth elements and oxygen element as main components.

The following chemical formula is an example of a chemical formula representing a compound containing elements with an ionic valence of two except for rare earth elements, rare earth elements and oxygen element—the compound that constitutes the main part of the light-transmitting sintered bodies according to the present invention.

$$\gamma_{(15)}\alpha_{(15)x9}O_{y9}$$

(where $\alpha_{(15)}$ is an element selected from the group consisting of Sc, Y, La, Ce, Pr, Nd, Sm, Eu, Gd, Tb, Dy, Ho, Er, Tm, Yb, Lu, B, Al, Ga, In, Tl, Sb, Bi; $\gamma_{(15)}$ contains as main component at least one element selected from the group consisting of Mg, Ca, Sr, Ba, Zn, Eu(II), Sm(II), Yb(II), Dy(II) and represents an element selected from the group consisting of Be, Mg, Ca, Sr, Ba, Ra, Eu(II), Sm(II), Yb(II), Dy(II), Zn, Cd, Hg, Mn; O is an oxygen atom; and where x9 is a value satisfying $1 \leq x9 \leq 24$; y9 is a value satisfying $2 \leq y9 \leq 38$, preferably $1 \leq x9 \leq 4$; $2 \leq y9 \leq 8$ or $1.8 \leq x9 \leq 7$, $3 \leq y9 \leq 12$, or $6 \leq x9 \leq 24$, $8.5 \leq y9 \leq 38$.

Examples of the single crystal phase compound of the chemical formula $\gamma_{(15)}\alpha_{(15)x9}O_{y9}$ include CaY$_2$O$_4$, (Sr, Eu)$_4$Al$_{14}$O$_{25}$, (Ba, Eu)Al$_{12}$O$_{19}$. The compounds formed with those compounds main component (that is, the compounds containing small quantities of compounds other than those compounds, too) can be obtained within the numerical limited range of x9, y9 and any of them can be a light-transmitting sintered body.

For information, typical compounds containing elements with an ionic valence of two except for rare earth elements, rare earth elements and oxygen element as main components are enumerated in Table 5.

TABLE 5

| Composition formula of compounds | Composition formula of phosphor |
|---|---|
| YMgAl$_{11}$O$_{19}$ | |
| LaMgAl$_{11}$O$_{19}$ | |
| (Y$_{0.7}$Ce$_{0.3}$)MgAl$_{11}$O$_{19}$ | |
| (Pr$_{0.7}$Tb$_{0.3}$)MgAl$_{11}$O$_{19}$ | |
| (Ce$_{0.6}$Tb$_{0.4}$)MgAl$_{11}$O$_{19}$ | (CeMgAl$_{11}$O$_{19}$:Tb$^{3+}$) |
| (Ce$_{0.6}$Tb$_{0.4}$)(Mg$_{0.9}$Mn$_{0.1}$)Al$_{11}$O$_{19}$ | |
| (CeMgAl$_{11}$O$_{19}$:Tb$^{3+}$,Mn$^{2+}$) | |
| Ce(Mg$_{0.9}$Mn$_{0.1}$)Al$_{11}$O$_{19}$ | (CeMgAl$_{11}$O$_{19}$:Mn$^{2+}$) |
| Ce(Mg$_{0.85}$Zn$_{0.05}$Mn$_{0.1}$)Al$_{11}$O$_{19}$ | (Ce(Mg,Zn)Al$_{11}$O$_{19}$:Mn$^{2+}$) |
| (Ce$_{0.6}$Tb$_{0.4}$)Al$_{12}$O$_{18}$N | (CeAl$_{12}$O$_{18}$N:Tb$^{3+}$) |
| (Ba$_{0.9}$Sm$_{0.1}$)MgAl$_{10}$O$_{17}$ | |
| (Ba$_{0.9}$Yb$_{0.1}$)MgAl$_{10}$O$_{17}$ | |
| (Ba$_{0.9}$Eu$_{0.1}$)MgAl$_{10}$O$_{17}$ | (BaMgAl$_{10}$O$_{17}$:Eu$^{2+}$) |
| (Ba$_{0.5}$Sr$_{0.4}$Eu$_{0.1}$) | ((Ba,Sr)MgAl$_{10}$O$_{17}$:Eu$^{2+}$, Mn$^{2+}$) |
| (Mg$_{0.9}$Mn$_{0.1}$)Al$_{10}$O$_{17}$ | |
| Eu(II)MgAl$_{10}$O$_{17}$ | |
| Ba(Mg$_{0.95}$Zn$_{0.05}$)Al$_{10}$O$_{17}$ | |
| BaMg(Al$_{0.95}$Ga$_{0.05}$)$_{10}$O$_{17}$ | |
| BaMg(Al$_{0.95}$B$_{0.05}$)$_{10}$O$_{17}$ | |
| BaAl$_{11}$O$_{18}$N | |
| SrAl$_{11}$O$_{18}$N | |
| (Ba$_{0.9}$Eu$_{0.1}$)Al$_{11}$O$_{18}$N | |
| Eu(II)Al$_{11}$O$_{18}$N | |
| (Zn$_{0.9}$Eu$_{0.1}$)Al$_{12}$O$_{19}$ | (ZnAl$_{12}$O$_{19}$:Eu$^{2+}$) |
| (Ca$_{0.9}$Eu$_{0.1}$)Al$_{12}$O$_{19}$ | (CaAl$_{12}$O$_{19}$:Eu$^{2+}$) |
| (Sr$_{0.9}$Sm$_{0.1}$)Al$_{12}$O$_{19}$ | (SrAl$_{12}$O$_{19}$:Sm$^{2+}$) |
| 0.82(Ba$_{0.9}$Eu$_{0.1}$)O.6Al$_2$O$_3$ | (0.82BaO.6Al$_2$O$_3$:Eu$^{2+}$) |
| 1.29(Ba$_{0.9}$Eu$_{0.1}$)O.6Al$_2$O$_3$ | (1.29BaO.6Al$_2$O$_3$:Eu$^{2+}$) |
| (Ba$_{0.9}$Eu$_{0.1}$)O.4Al$_2$O$_3$ | (BaO.4Al$_2$O$_3$:Eu$^{2+}$) |
| 2(Sr$_{0.9}$Eu$_{0.1}$)O.3Al$_2$O$_3$ | (2SrO.3Al$_2$O$_3$:Eu$^{2+}$) |
| 4(Sr$_{0.9}$Eu$_{0.1}$)O.7Al$_2$O$_3$ | (4SrO.7Al$_2$O$_3$:Eu$^{2+}$) |
| (Ba$_{0.9}$Eu$_{0.1}$)Al$_2$O$_4$ | (BaAl$_2$O$_4$:Eu$^{2+}$) |
| (Ba$_{0.9}$Eu$_{0.1}$)Al$_2$O$_4$ | (BaAl$_2$O$_4$:Eu$^{2+}$) |
| ZnLa$_2$O$_4$ | |

TABLE 5-continued

| Composition formula of compounds | Composition formula of phosphor |
|---|---|
| $MgSm_2O_4$ | |
| $CaY_2O_4$ | |
| $SrYb_2O_4$ | |
| $BaEu_2O_4$ | |
| $Ca(Y_{0.9}Eu_{0.1})_2O_4$ | $(CaY_2O_4:Eu^{3+})$ |
| $Ba(Gd_{0.9}Tb_{0.1})_2O_4$ | $(BaGd_2O_4:Tb^{3+})$ |

As set forth above, the light-transmitting sintered bodies according to the present invention can be roughly classified into four groups or substances represented by five chemical formulae. These substances are already known in the form of powder or granule, for example. But it is according to the present invention that those substances are formed into a light-transmitting sintered body under specific conditions. Details including the manufacturing method will be described later.

The light-transmitting sintered bodies according to the present invention include light-transmitting sintered bodies (light-transmitting fluorescent sintered bodies: light-transmitting fluorescent ceramics) that emit fluorescence (with an luminescence peak wave-length of 300 nm to 1,000 nm) under irradiation with ultraviolet rays with a wave-length of not shorter than 100 nm and not longer than 380 nm.

The above-mentioned light-transmitting fluorescent sintered bodies are formed with part of the elements making up the light-transmitting sintered bodies replaced with an element that can be the luminescence center.

The light-transmitting sintered bodies that emit fluorescence can be formed using the following phosphor. Most of the phosphor given below are high-efficient ultraviolet rays-excited phosphor that emit fluorescence with high efficiency under irradiation with ultraviolet rays with a wavelength of 140 to 280 nm. The phosphor exhibit fluorescence over a wide wave-length range from blue to red (for example, blue, green or red fluorescence).

(1) Phosphor having the magnetoplumbite structure or the β-alumina structure.

(BAL, BAM, BAE, CAT, $BaAl_{11}O_{16}N$: $Eu^{2+}$, $BaMgAl_{10}O_{17}$: $Mn^{2+}$, $(Ba, Sr)MgAl_{10}O_{17}$: $Eu^{2+}$, $(Ba, Sr)MgAl_{10}O_{17}$: $Mn^{2+}$, $CeMgAl_{11}O_{19}$, $CeMgAl_{11}O_{19}$: $Tb^{3+}$, $CeMgAl_{11}O_{19}$: $Mn^{2+}$, $CeMgAl_{11}O_{19}$: $Mn^{2+}$, $CeAl_{12}O_{18}N$: $Tb^{3+}$ etc.)

(2) Aluminate phosphor not with $\zeta_3Al_5O_{12}$ as fluorescent substance matrix where $\zeta$ represents rare earth elements with an ionic valence of three.

(Bivalent rare earth elements ion-activated aluminate-type efficient phosphor such as SAL, SAE, $BaAl_2O_4$: $Eu^{2+}$, $SrAl_2O_4$: $Eu^{2+}$, $SrAl_2O_4$: $Dy^{3+}$, $CaAl_2O_4$: $Eu^{2+}$, $CaAl_2O_4$: $Nd^{3+}$; and phosphor containing rare earth elements with an ionic valence of two, aluminum element and oxygen element as main components such as $Eu(II)Al_2O_4$, $Sm(II)Al_2O_4$, $Yb(II)Al_2O_4$, $Eu(II)4Al_{14}O_{25}$, $Sm(II)4Al_{14}O_{25}$, $Yb(II)4Al_{14}O_{25}$, $Eu(II)MgAl_{10}O_{17}$, $Sm(II)Al_{12}O_{19}$, $Yb(II)Al_{11}O_{16}N$ etc.

(3) Phospher containing elements with an ionic valence of two except for rare earth elements, rare earth elements and oxygen element as main components.

($CaY_2O_4$: $Eu^{3+}$, $MgSc_2O_4$: $Tb^{3+}$, $SrLa_2O_4$: $Ce^{3+}$, $BaGd_2O_4$: $Dy^{3+}$, $ZnLa_2O_4$: $Yb^{3+}$ etc.)

The light-transmitting sintered bodies according to the present invention are characterized in that they are formed with a compound having the magnetoplumbite structure as main component, with a compound having the β-alumina structure except for aluminum oxide as main component, with a compound containing mainly rare earth elements with an ionic valence of two, aluminum element and oxygen element as main components or with a compound containing elements with an ionic valence of two except for rare earth elements, rare earth elements and oxygen element as main components. Also, the light-transmitting sintered bodies are formed with a compound represented by the composition formula $\gamma_{(14)}Al_xO_y$.

Therefore, it is only required that the main materials forming the light-transmitting sintered bodies are those compounds, and the present invention is not limited to the shape, size, light-transmitting performance (transmittance of the sintered body) or the like of the light-transmitting sintered bodies in particular.

Furthermore, the light-transmitting sintered bodies are not limited to light emitting performances (color of emitted light, intensity of light emission, afterglow time etc.).

A light-transmitting sintered body can be made with any of the compounds according to the present invention without difficulty described in Embodiment 1 by the method which will be explained. A disk-formed sintered body 20 mm in diameter and 0.5 mm in thickness, for example, could be made that had light transmittance, which was visually confirmed (linear transmittance of visible rays within a range between 1% and 100%). A visible rays linear transmittance between not lower than 3% and less than 100% can be achieved by selecting conditions, as by Raising the calcination temperature near the melting point or 1,700 to 1,900° C., Prolonging the calcination time to not shorter than 10 hours, Using fine powder with a particle size of 1 nm to 10 nm as calcination material, Calcinating in vacuum so as to preclude the possibility that foams are caused deteriorating the transmittance during calcination, Selecting a calcination temperature that permits forming a mixture of more active compounds, Using a sophisticated forming methods using a hot pressure or hot isostatic press (HIP), Setting the thickness of the light-transmitting sintered body at 100 μm or so.

In this connection, while the visible rays diffuse transmittance is not examined, it would be clear to those skilled in art that a diffuse transmittance within a range between not lower than 1% and less than 100% (not lower than 3% and less than 100% by optimizing the production conditions) could be obtained.

The light-transmitting sintered bodies obtained are applicable to a variety of components such as the hole for high temperature, optical lens, infrared windowpane, substrate for mounting functional devices, ornamental articles. In addition to the light-emitting tube and electric discharge lamp, the light-transmitting sintered bodies can find uses in a variety of electronic devices such as optical memory, optical shutter, scintillator and solid laser.

An example of the method for making light-transmitting sintered bodies according to the present invention will now be explained with reference to the drawings. It is understood that the light-transmitting sintered bodies according to the present invention are not limited by the following manufacturing method.

Figure 3:
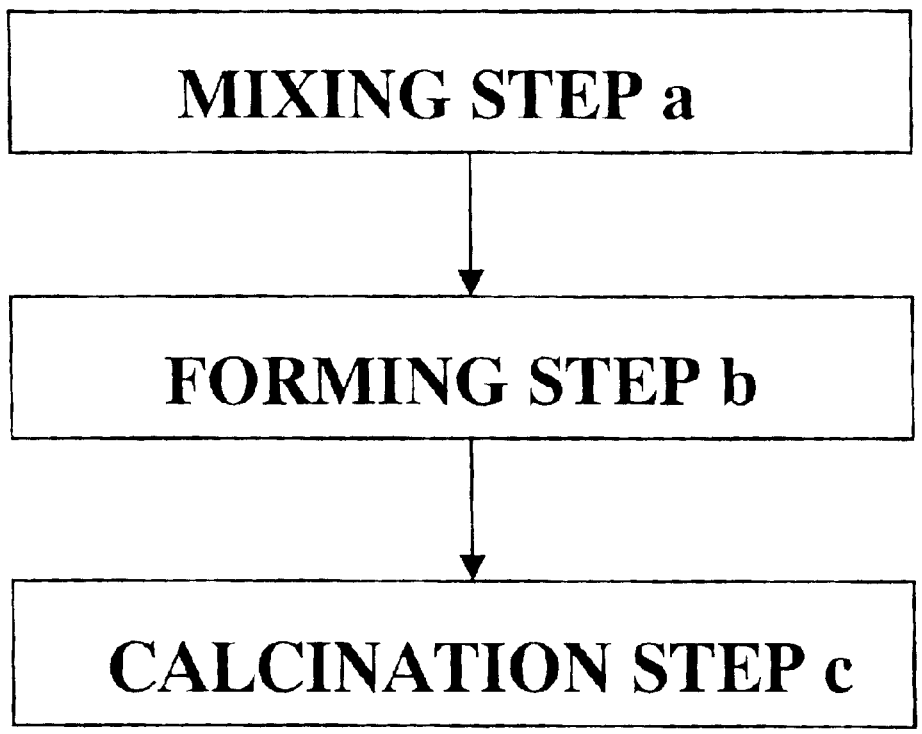
FIG. 3 is a flow diagram showing an example of the method for making a light-transmitting sintered body according to the present invention.

FIG. 3 is a flow diagram showing an example of the method for manufacturing light-transmitting sintered bodies according to the present invention.

In FIG. 3, the mixing step a is a step for mixing the materials of the light-transmitting sintered body, that is the sintered body materials of which the light-transmitting sintered body described above can be made.

The form of the sintered body materials that can be made into the above-mentioned light-transmitting sintered body is not restrictive in particular. If it is desirable that the materials are prepared into inorganic compound powder with a median particle size of not smaller than 1 nm and not larger than 100 μm, preferably not smaller than 1 nm and not larger than 10 μm, more preferably not smaller than 1 nm and not larger than 1 μm, because it is readily available and it is easy to make into a formed body. In addition, the reaction between sintered body materials would proceed relatively satisfactorily.

In addition to inorganic compound powder, the materials for sintered bodies include metal compact, gaseous or liquid materials, sol-formed or gel-formed materials such as alkali metallic elements, alkaline earth metal elements, metallic elements, rare earth elements, oxygen element, nitrogen elements, sulfur element and halogen elements.

The light transmittability of the light-transmitting sintered body is varied greatly depending on the purity of sintered body materials. To obtain the aforementioned visible rays linear transmittance (not lower than 1% and less than 100%, especially not lower than 3% and less than 100%), it is necessary that the sintered body materials should be not lower than 99.9% in purity.

In FIG. 3, the forming step b is to form or compact the following materials into a specific shape: the sintered body material mixed in the mixing step (for example, mixed with inorganic compound powder material for use as material for the sintered body) and pre-calcinated material or the above-mentioned mixed inorganic compound powder material pre-calcinated in the atmospheric air, for example (for example, pre-calcinated material of inorganic compound powder obtained by pre-calcinating the above-mentioned inorganic compound powder mixed material). This step is carried out by hot pressure or by HIP or in a simplified way using a mold press, cold hydrostatic press, extrusion molding. Forming by cast molding or the like is also useful.

It is noted that the pre-calcination is to raise the reactivity in the materials. While this step is desirable, it may be dropped to simplify the manufacturing process. The time for pre-calcination is not restricted in particular, but is usually conducted for more than 10 minutes. The temperature for this step is not lower than 800° C. and not higher than 1,800° C., preferably not lower than 1,000° C. and not higher than 1,600° C. The pre-calcination causes a chemical reaction to some extent, can keep down unusual particle growth and keep up reactivation of the material. That is, the pre-calcination can improve the light-transmitting property of the sintered body.

It is desirable that the forming is performed in such a way that the density of the formed material is as high as possible. That is because it reduces the voids in the compact as much as possible that lowers the light transmittability of the light-transmitting sintered body and produces a light-transmitting sintered body with good light transmittability.

When a mold press is used, for example, a light-transmitting sintered body can be obtained simply by pressing the material under not lower than 100 kg/cm$^3$. To obtain good light transmittability, however, the materials should be formed or compacted under a pressure of not lower than 250 kg/cm$^3$, preferably not lower than 2,500 kg/cm$^3$ so as to further reduce the voids among the particles and to increase the contact area among the particles. The density of the compact or formed material is different from material to material. The higher the density is, the higher the reactivity among the particles. That increases light transmittability. The density should be not lower than 1.0 g/cm$^3$, preferably not lower than 2.0 g/cm$^3$.

The materials can be compacted or formed into any shape by mold press, cold hydrostatic press, extrusion or the like and light-transmitting sintered bodies can be obtained with ease at low costs.

The calcination step in Step 3 (c) is a step for calcinating the compact formed of the sintered body material mixture in Step b. The calcination temperature is between not lower than a temperature corresponding to 85% of the melting point of the compounds forming the light-transmitting sintered body and not higher than the melting point, preferably between not lower than a temperature corresponding to 90% of the melting point and not higher than the melting point. Since the materials forming the light-transmitting sintered body contain materials with unknown melting points, calcination is performed with the calcination temperature set depending on the kind of material. To be concrete, the calcination temperature range is between not lower 1,600° C. and not higher than 2,000° C., preferably not lower than 1,700° C. and not higher than 1,900° C.

In the calcination step, the particles of the mixed sintered body material forming a sintered body react with each other into a light-transmitting compound of a desired composition, thus producing a light-transmitting sintered body.

The reason why the calcination temperature range is limited to between not lower a temperature corresponding to 85% of the melting point of the compounds forming the light-transmitting sintered body and not higher than the melting point is this. If calcination is carried out at a temperature lower than the temperature (1,600° C., for example) corresponding to 85% of the above-mentioned melting point, calcination among the materials is insufficient, resulting in a sintered body with a low density with many voids and low light transmittability. If, on the other hand, the calcination temperature is higher than the aforementioned melting temperature (2,000° C., for example), the sintered body can melt taking in foams or certain elements can evaporate, causing the "slipping" of the composition, deteriorating the light transmittability. As a result, a desired light-transmitting sintered body fails to be obtained.

Furthermore, the calcination atmosphere in calcination Step c is not restrictive in particular, but it is known from experience that a light-transmitting sintered body can be obtained with good results in an atmosphere of such an element with a small atomic radius as hydrogen or helium gas, a reduced pressured atmosphere or a vacuum atmosphere.

The reason for that is that gas remaining in the voids are easy to remove in such atmospheres and a close sintered body can be obtained.

The desirable calcination atmosphere is a vacuum atmosphere lower than $1\times10^{-2}$ Torr, preferably a vacuum atmosphere lower than $1\times10^{-3}$ Torr. Other atmospheres such as hydrogen atmosphere, nitrogen atmosphere and inert gas atmosphere may be used.

The heating rate, cooling rate and retention time of the calcination temperature in calcination Step c are not restrictive in particular. But with the heating rate and cooling rate set at 50 to 400° C./hour and the retention time set at 1 to 100 hours, the time to produce a light-transmitting sintered body is relatively short, lessening the burden on heating equipment such as the oven.

It is desirable that the light-transmitting sintered body thus obtained, if it is be used in a variety of component parts and electronic devices, should be polished by polishing equipment, for example, to smooth the surface of the light-transmitting sintered body or reduce the thickness to a specific size.

A disk-formed sintered body 20 mm in diameter and 0.5 mm thickness was made by the method described above. It was confirmed that it was easy to make a light-transmitting sintered body having such light transmittability as that could be confirmed by visual inspection. By optimizing the manufacturing conditions depending on the kind of material, the visible rays linear transmittance between not lower 3% and less than 100% can be obtained.

Now, examples of light-transmitting sintered bodies according to the present invention will be described in detail.

EXAMPLE 1

There will be explained a light-transmitting sintered body formed of a compound of the chemical formula $Ce_{0.6}Tb_{0.4}MgAl_{11}O_{19}$ as an example of a light-transmitting sintered body containing a compound having the magnetoplumbite structure as main component. The compound of the chemical formula $Ce_{0.6}Tb_{0.4}MgAl_{11}O_{19}$ is a fluorescent substance for fluorescent lamps which emits high-efficient blue (luminescence peak wavelength: 542 nm) under irradiation with ultraviolet rays with a wave-length of 253.7 nm and is called the $CeMgAl_{11}O_{19}$: $Tb_{3+}$ (CAT) among those skilled in the art. However, CAT is offered as powder and its existence in the form of light-transmitting sintered body is not known. Furthermore, compounds having the magnetoplumbite structure have been developed as powder fluorescent substance for fluorescent lamps and therefore the channel for the supply of the materials required for production of the compounds is well established, and inexpensive materials for fluorescent substance are readily available.

The following powder materials were used for light-transmitting sintered bodies: $CeO_4$ (purity 99.99%), $Tb_4O_7$ (purity 99.9%), basic-$MgCO_3$ (($MgCO_3$)$_4$·Mg(OH)$_2$·3H$_2$O: purity 99.98%), $Al_2O_3$ (purity 99.999%). All the materials were 0.5 to 5 μm in median particle size.

First, the respective sintered body materials were weighed out and mixed so that the composition formula was $Ce_{0.6}Tb_{0.4}MgAl_{11}O_{19}$. To be concrete, 5.16 g of $CeO_4$ powder, 3.74 g of $Tb_4O_7$ powder, 4.80 g of basic-$MgCO_3$ powder and 28.0 g of $Al_2O_3$ powder were weighed out using an electronic balance. And they were mixed using a mixer like a ball mill, and thus a mixture of those powders were obtained.

Then, the powder mixture was placed in an alumina boat (purity 99.9%), and calcinated in the atmospheric air for two hours (for pre-calcination) at 1,600° C. using a box-formed electric furnace to produce a starting compound powder (starting fluorescent substance) with a compound of the chemical formula $Ce_{0.6}Tb_{0.4}MgAl_{11}O_{19}$ as main component. The crystal formation of this starting compound powder was studied by the X-ray diffraction method, and the starting compound powder was the $Ce_{0.6}Tb_{0.4}MgAl_{11}O_{19}$ compound close to the single crystal phase. It is reported that the $Ce_{0.6}Tb_{0.4}MgAl_{11}O_{19}$ compound has a melting point of 1,950±20° C.

Then, 1 g of the starting compound powder was placed in a circular cylinder-formed mold 2.0 cm in diameter and pressure molded under a pressure of 2,500 kg/cm³ to obtain a circular-cylindrical pressed compact some 2 cm in diameter and some 2 mm in thickness. This pressed compact was placed in the box-formed electric furnace and calcinated in the atmospheric air for two hours at 1,800° C. This calcination temperature corresponds to some 92% of the melting point of the $Ce_{0.6}Tb_{0.4}MgAl_{11}O_{19}$ compound and is a temperature not lower than 85% of the melting point. Here, it was found that the sintered body was light transmittable even when the pressure for the pressure molding was low at 100 kg/cm³. While the light-transmittability was so weak that it was confirmed only when it was examined in a visual inspection through the white light of a fluorescent lamp, the sintered body was found be light transmittable even if pressure molded under such a low pressure.

Five to ten pieces of calcinated pressed sintered bodies were made and studied. They were circular cylindrical sintered bodies 1.6 to 1.9 cm in diameter and 0.5 to 1.8 in thickness. In addition, the crystal formation of the pressed sintered bodies after calcinations was examined. When examined by the X-ray diffraction method, the sintered bodies were single crystal phase $Ce_{0.6}Tb_{0.4}MgAl_{11}O_{19}$ compounds. Also, the calcinated pressed compacts were examined with regard to photoluminescence characteristics under irradiation with ultraviolet rays with a wave-length of 253.7 nm. They exhibited as high luminance as the $Ce_{0.6}Tb_{0.4}MgAl_{11}O_{19}$ fluorescent substance put on the market as the substance for fluorescent lamps and emitted a green light with the luminescence peak at a wave-length of 542 nm. This shows that the pressured compact after calcination is a single crystal $Ce_{0.6}Tb_{0.4}MgAl_{11}O_{19}$ fluorescent substance that shows high luminous efficiency. The linear transmittance of the calcinated pressed compact in the visible rays range was not lower than 3% and not higher than 50%, though that depends on the wave-length. Needless to say, the linear transmission can be improved by optimizing the manufacturing conditions of light-transmitting sintered bodies (by, for example, ① using high-reactivity fine particle light-transmitting sintered body material with a median particle size of 1 nm to 10 nm, ② using high light-transmitting sintered body material obtained by coprecipitation method, ③ using a flux (calcination auxiliary), ④ calcinating at a high temperature—not lower than 1,800° C., ⑤ calcinating for a long time exceeding two hours, ⑥ calcinating in vacuum or in He atmosphere, ⑦ forming by a high technical method such as hot press, HIP or the like. It is easy to imagine that a light-transmitting sintered body having a high linear transmittance of not lower than 70% can be manufactured.

That way, light-transmitting sintered bodies (light-transmitting fluorescent sintered bodies) of the chemical formula $Ce_{0.6}Tb_{0.4}MgAl_{11}O_{19}$9 could be obtained.

When inexpensive powder with a purity not higher than 99.9% was used in part or alone as light-transmitting sintered body material, the transmittance of the sintered body tended to sharply drop.

For sake of simplicity, no calcination auxiliary to raise calcination was used in Example 1. Light-transmitting sintered bodies according to the present invention may be made with or without using a calcination auxiliary. Among the calcination auxiliaries are a variety of metallic oxides, $AlF_3$ and $H_3BO_3$. For calcination, it is desirable to add 0.01 to 0.3 mol per mol of $Al_2O_3$, for example.

In Example 1, it was described that pre-calcination was performed in the atmospheric air for two hours at 1,600° C. The pre-calcination is not restricted to the temperature, time and the atmosphere. And without pre-calcination, the same light-transmitting sintered body as mentioned above can be also obtained.

In Example 1, furthermore, the materials used for light-transmitting sintered bodies were $CeO_4$, $Tb_4O_7$, basic- MgCO$_3$ and Al$_2$O$_3$, all in the form of powder. The materials for light-transmitting sintered bodies are not limited to those materials. It is noted that a similar light-transmitting sintered body could be obtained using, that is, press-forming and calcinating the Ce$_{0.6}$Tb$_{0.4}$MgAl$_{11}$O$_{19}$ compound powder (CAT fluorescent substance powder with a median particle size of 3 to 10 μm)—marketed as fluorescent substance for fluorescent lamps—as material for light-transmitting sintered bodies.

In Example 1, a light-transmitting sintered body (light-transmitting fluorescent sintered body) formed of the Ce$_{0.6}$Tb$_{0.4}$MgAl$_{11}$O$_{19}$ compound as main component was described as an example of the light-transmitting sintered body prepared of a compound having the magnetoplumbite structure as main component. When the compounds enumerated in Table 1 were used the same way, it was possible to produce light-transmitting sintered bodies with the same light transmittance as the Ce$_{0.6}$Tb$_{0.4}$MgAl$_{11}$O$_{19}$ compound.

EXAMPLE 2

Next, there will be explained a light-transmitting sintered body according to the present invention formed of a compound of the composition formula Ba$_{0.9}$Eu$_{0.1}$MgAl$_{10}$O$_{17}$ as an example of the light-transmitting sintered body formed of a compound having the β-alumina structure as main component. The Ba$_{0.9}$Eu$_{0.1}$MgAl$_{10}$O$_{17}$ compound is a fluorescent substance for fluorescent lamps and plasma display panel which emit a high-efficient green light (with a luminescence peak wave-length: near 450 nm) under irradiation with ultraviolet rays with a wave-length of 253.7 nm, and is called the BaMgAl$_{10}$O$_{17}$: Eu$^{2+}$ (BAM) by those skilled in the art of fluorescent substance. But BAM is offered as powder and the existence of BAT in the form of light-transmitting sintered body is not known. Furthermore, compounds having the β-alumina structure have been developed as powder fluorescent substance for fluorescent lamps and therefore the channel for the supply of the materials required for production of the compounds is well established, and inexpensive materials for fluorescent substance are readily available.

As the composition formula indicates, the BAM fluorescent substance is a compound containing rare earth elements with an ionic valence of two, aluminum element and oxygen element as main components.

The basic materials for light-transmitting sintered bodies used in Example 2 were BaCO$_3$ (purity 99.98%), Eu$_2$O$_3$ (purity 99.99%), basic-MgCO$_3$ (purity 99.98%), Al$_2$O$_3$ (purity 99.999%), all in the form of powder with a median particle size of 0.5 to 5 μm).

First, the respective materials for sintered bodies were weighed out and mixed so that the chemical formula was Ba$_{0.9}$Eu$_{0.1}$MgAl$_{10}$O$_{17}$. To be concrete, 8.88 g of BaCO$_3$ powder, 0.88 g of Eu$_2$O$_3$ powder, 4.80 g of basic-MgCO$_3$ powder, 25.5 g of Al$_2$O$_3$ powder were weighed out using an electronic balance. And they were mixed using a mixer like an automatic mortar or a ball mill, and thus a mixture of those powders was obtained. Then, as Example 1, the powder mixture was placed in an alumina boat, and pre-calcinated in the atmospheric air for two hours at 1,600° C. using a box-formed electric furnace to produce a starting compound powder (starting fluorescent substance) with a compound of the chemical formula Ba$_{0.9}$Eu$_{0.1}$MgAl$_{10}$O$_{17}$ as main component. The crystal formation of this starting compound powder was studied by the X-ray diffraction method, and the starting compound powder was the Ba$_{0.9}$Eu$_{0.1}$MgAl$_{10}$O$_{17}$ compound close to the single crystal phase. It is reported that melting point of the Ba$_{0.9}$Eu$_{0.1}$MgAl$_{10}$O$_{17}$ compound is 1,920±20° C.

Then, as in Example 1, 1 g of the starting compound powder was placed in a circular cylinder-formed mold 2.0 cm in diameter and pressure molded under a pressure of 2,500 kg/cm$^3$ to obtain a circular-cylindrical pressed compact some 2 cm in diameter and some 2 mm in thickness. This pressed compact was placed in the box-formed electric furnace and calcinated in the atmospheric air for two hours at 1800° C. This calcination temperature corresponds to some 94% of the melting point of the Ba$_{0.9}$Eu$_{0.1}$MgAl$_{10}$O$_{17}$ compound.

It was found that the sintered body thus obtained was light transmittable even when the pressure for the pressure molding was low at 100 kg/cm$^3$. While the light-transmittability was so weak that it was confirmed only when it was examined in a visual inspection through the white light of a fluorescent lamp.

Pressed compacts obtained after calcination were circular cylindrical 1.6 to 1.9 cm in diameter and 0.5 to 1.8 mm in thickness. In addition, the crystal formation of the pressed sintered bodies after calcination was a Ba$_{0.9}$Eu$_{0.1}$MgAl$_{10}$O$_{17}$ compound of almost a single crystal phase. In this connection, if a compound containing Eu with an ionic valence of two (Ba$_{0.9}$Eu$_{0.1}$MgAl$_{10}$O$_{17}$ ) is calcinated in the atmospheric air, a compound with Eu with an ionic valence of three (Eu(III)MgAl$_{11}$O$_{19}$, for example) is usually formed. But few compounds containing such trivalent Eu were observed in the light-transmitting sintered bodies in Example 2. That is probably because the calcination temperature was high at 1,800° C. and the sintered body was in a position to tend to be reduced even though the calcination was performed in the atmospheric air.

The photoluminescence characteristics were examined by irradiating the pressured compacts after calcination with ultraviolet rays with a wave-length of 253.7 nm. Though the luminescence was about half that of the Ba$_{0.9}$Eu$_{0.1}$MgAl$_{10}$O$_{17}$ fluorescent substance which is marketed for fluorescent lamps, the calcinated pressed compacts exhibited a relatively high degree of luminance and emitted blue light having an luminescence peak near a wave-length of 450 nm. These show that the pressed compacts after calcination are single crystal phase Ba$_{0.9}$Eu$_{0.1}$MgAl$_{10}$O$_{17}$ phosphor exhibiting a high luminous efficiency (photoluminescence performance).

Though not confirmed by experiments, it is evident to those skilled in the art that if the atmosphere for heating the pressed compact is not the atmospheric air but such an atmosphere as vacuum and inert gas atmosphere where the sintered body is not oxidized easily, then the luminescence of the sintered body can be improved.

The linear transmittance of the pressed compacts after calcination in the visible rays range was not lower than 3% and not higher than 50% as in the case of the Ce$_{0.6}$Tb$_{0.4}$MgAl$_{11}$O$_{19}$ light-transmitting sintered bodies described in Example 1, but it is clear to those skilled in the art that it is possible to make a light-transmitting sintered body with a linear transmittance of not lower than 70% by optimizing the manufacturing conditions.

Thus obtained were the light-transmitting sintered bodies (light-transmitting fluorescent sintered bodies) formed of a compound of the composition formula Ba$_{0.9}$Eu$_{0.1}$MgAl$_{10}$O$_{17}$.

When inexpensive powder with a purity not higher than 99.9% was used in part or alone as light-transmitting sintered body material, the transmittance of the sintered body tended to deteriorate as in the case of the $Ce_{0.6}Tb_{0.4}MgAl_{11}O_{19}$ light-transmitting sintered bodies. As in the case of the $Ce_{0.6}Tb_{0.4}MgAl_{11}O_{19}i$ light-transmitting sintered bodies, it was possible to use such auxiliaries as various metallic oxides, $AlF_3$ and $H_3BO_3$.

Also, as in the case of the $Ce_{0.6}Tb_{0.4}MgAl_{11}O_{19}$ light-transmitting sintered bodies, the same light-transmitting sintered bodies as described above could be obtained without pre-calcination. Also, it was possible to use the commercially available $Ba_{0.9}Eu_{0.1}MgAl_{10}O_{17}$ compound powder (BAM fluorescent substance powder with a median particle size of 2 to 10 $\mu$m) as material for light-transmitting sintered body. That is, by pressure forming and calcinating this material, a light-transmitting sintered body could be produced.

In Example 2, the light-transmitting sintered body (light-transmitting fluorescent sintered body) formed of the $Ba_{0.9}Eu_{0.1}MgAl_{10}O_{17}$ compound as main component was described as an example of the light-transmitting sintered body prepared of a compound having a β-alumina structure as main component. Using the compounds enumerated in Table 2 the same way, it was possible to produce light-transmitting sintered bodies with the same light transmittance as the $Ba_{0.9}Eu_{0.1}MgAl_{10}O_{17}$ compound.

EXAMPLE 3

Next, there will be explained a light-transmitting sintered body according to the present invention formed of a compound of the chemical formula $Sr_{0.97}Eu_{0.03}Al_2O_4$ as main component as an example of the light-transmitting sintered body formed of a compound containing rare earth elements with an ionic valence of two, aluminum element and oxygen element as main components and a light-transmitting sintered body formed of a compound of the composition formula $BAl_xO_y$ as main component. The $Sr_{0.97}Eu_{0.03}Al_2O_4$ compound is a fluorescent substance that was taken up as fluorescent substance for fluorescent lamps emitting a relatively high-efficient bluish green light (with a an luminescence peak wave-length: near 500 nm) under irradiation with ultraviolet rays with a wave-length of 253.7 nm and of which the application to fluorescent lamps was studied at the time when the fluorescent lamp was developed. It is a fluorescent substance that is described as $SrAl_2O_4$: $Eu^{2+}$ fluorescent substance among those skilled in the art. It is well known that by co-activating $Dy^{3+}$ ion, the substance can be a fluorescent substance with long afterglow characteristics. But as in the case of the above-mentioned materials, this substance is offered in the form of powder and its existence in the form of a light-transmitting sintered body is not known.

It is understood that the term "long afterglow characteristics" used herein mean characteristics that after a fluorescent substance is irradiated with ultraviolet rays or visible rays for several minutes to tens of minutes, the fluorescent substance emits light for several minutes to tens of hours.

The light-transmitting sintered body materials used here were $SrCO_3$ (purity 99.98%), $Eu_2O_3$ (purity 99.99%) and $Al_2O_3$ (purity 99.999%), all in the form of powder with a median particle size of 0.5 to 5 $\mu$m.

First, the respective sintered body materials were weighed out and mixed so that the composition formula was $Sr_{0.97}Eu_{0.03}Al_2O_4$. To be concrete, 7.16 g of $SrCO_3$ powder, 0.264 g of $EU_2O_3$ powder, 5.10 g of $Al_2O_3$ were mixed as in Examples 1 and 2 and a powder mixture was obtained. Then, the mixture was pre-calcinated in the atmospheric air for two hours at 1,600° C. as in Examples 1 and 2 and a starting compound powder formed of a compound of the chemical formula $Sr_{0.97}Eu_{0.03}Al_2O_4$ as main component was produced. The crystal formation of the starting compound powder was examined by x-ray diffraction method, and the starting compound powder was found to be a $Sr_{0.97}Eu_{0.03}Al_2O_4$ compound close to the single crystal phase.

As in Examples 1, 2, then, 1 g of the starting compound powder was put in the mold and pressure-formed under a pressure of 2,500 kg/cm³. And a circular cylindrical pressed compact some 2 cm in diameter and about 2 mm in thickness was obtained. This pressed compact was placed in a box-formed electric furnace and calcinated in the atmospheric air for two hours at 1,750° C. to produce a sintered body.

The pressed compacts after calcination were circular cylindrical 1.6 to 1.9 cm in diameter and 0.5 to 1.8 mm in thickness as Example 1, and the crystal formations of the pressed compacts after calcination were $Sr_{0.97}Eu_{0.03}Al_2O_4$ compounds of almost the single crystal phase.

Also, the calcinated pressed compacts were examined with regard to photoluminescence characteristics under irradiation with ultraviolet rays with a wave-length of 253.7 nm. They exhibited relatively high luminance though it was some 30% of the luminance of the fluorescent substance powder which is known as a fluorescent substance with a long afterglow lasting several seconds to several minutes, and emitted a bluish green light with a luminescence peak near a wave-length of 500 nm. These showed that the pressed compacts after calcination were $Sr_{0.97}Eu_{0.03}Al_2O_4$ phosphor of the single crystal that exhibit high luminous efficiency (photoluminescence performance).

As Examples 1, 2, the linear transmittance of the pressed compacts after calcination in the visible rays range were not lower than 3% and not higher than 50%, but it was easy to predict that a light-transmitting sintered body with a high linear transmittance not lower than 70% could be made by optimizing the manufacturing conditions etc.

Thus obtained were light-transmitting sintered bodies (light-transmitting fluorescent sintered bodies) formed of a compound of the composition formula $Sr_{0.97}Eu_{0.03}Al_2O_4$.

As in the case of light-transmitting sintered bodies described in Examples 1, 2, when inexpensive powder with a purity not higher than 99.9% was used in part or alone as light-transmitting sintered body material, the transmittance of the sintered body sharply dropped. As in Examples 1, 2, it was possible to use such calcination auxiliaries as metallic oxides, $AlF_3$ or $H_3BO_3$. Also, the same light-transmitting sintered bodies as described above could be obtained without pre-calcination. Also, the $Sr_{0.97}Eu_{0.03}Al_2O_4$ compound powder made in advance in the reduction atmosphere by calcination was used as material for light-transmitting sintered body. The powder was pressure-formed and calcinated, and a light-transmitting sintered body could be obtained as in the case of the light-transmitting sintered bodies in Examples 1 and 2.

In Example 3, the light-transmitting sintered bodies formed of the $Sr_{0.97}Eu_{0.03}Al_2O_4$ compound were described as examples of the light-transmitting sintered body formed mainly of a compound containing rare earth elements with an ionic valence of two, aluminum element and oxygen element and the light-transmitting sintered body formed of a compound of the composition formula $Al_xO_y$ as the main component. With the compounds enumerated in Tables 3, 4, also, light-transmitting sintered bodies with transmittance could be obtained.

EXAMPLE 4

Now, a light-transmitting sintered body formed of a compound of the composition formula $Ca(Y_{0.9}Eu_{0.1})_2O_4$ will be explained as an example of the light-transmitting sintered body formed mainly of a compound containing elements with an ionic valence of two except for the above-mentioned rare earth elements, rare earth elements and oxygen element. The $Ca(Y_{0.9}Eu_{0.1})_2O_4$ compound is a red fluorescent substance that emits almost the same light as the $(Y_{0.9}Eu_{0.1})_2O_4$ compound $(Y_2O_4: Eu^{2+}$ fluorescent substance) which is well known as red fluorescent substance to those skilled in the art of phosphor. The $Ca(Y_{0.9}Eu_{0.1})_2O_4$ compound emits a relatively high efficient red light (with a luminescence peak wave-length: 611 nm) under irradiation with ultraviolet rays with a wave-length of 253.7 nm. But as in the case of the other substances mentioned earlier, this substance is offered in the form of powder and its existence in the form of a light-transmitting sintered body is not known.

The light-transmitting sintered body materials used were $CaCO_3$ (purity 99.99%), $Y_2O_3$ (purity 99.9%), $Eu_2O_3$ (purity 99.99%).

First, the respective sintered body materials were weighed out and mixed so that the composition formula was $Ca(Y_{0.9}Eu_{0.1})_2O_4$. To be concrete, 5.00 g $CaCO_3$ powder, 10.2 g of $Y_2O_3$ powder, 1.76 g of $Eu_2O_3$ powder were used. As in Examples 1 to 3, a powder mixture was obtained from those powders, and then pre-calcinated in the atmospheric air for two hours at 1,600° C. to produce a starting compound mixture formed mainly of a compound of the chemical formula $Ca(Y_{0.9}Eu_{0.1})_2O_4$. An examination by the X-ray diffraction method showed that the starting compound powder was a $Ca(Y_{0.9}Eu_{0.1})_2O_4$ compound close to the single crystal phase.

Then, in Examples 1 to 3, 1 g of the starting compound powder was placed in the mold and pressure-formed to obtain a circular cylindrical pressed compact about 2 cm in diameter and about 2 mm in thickness, and calcinated in the atmospheric air for two hours at 1,750° C. to obtain a sintered body.

Pressed compacts obtained after calcination were circular cylindrical 1.6 to 1.9 cm in diameter and 0.5 to 1.8 in thickness. In addition, the crystal formations of the pressed sintered bodies after calcination were $Ca(Y_{0.9}Eu_{0.1})_2O_4$ compounds of almost a single crystal phase. Also, the calcinated pressed compacts were examined with regard to photoluminescence characteristics under irradiation with ultraviolet rays with a wave-length of 253.7 nm. They exhibited relatively high or as high luminance as the $Ca(Y_{0.9}Eu_{0.1})_2O_4$ fluorescent substance powder and emitted a red light with the luminescence peak near a wave-length of 611 nm. The spectral distribution (emission spectrum) of this red light emission was almost the same as the distribution of the $Y_2O_3: Eu^{3+}$ red fluorescent substance for fluorescent lamps. These showed that the calcinated pressured compacts were single crystal $Ca(Y_{0.9}Eu_{0.1})_2O_4$ phosphor that exhibited a high luminous efficiency (photoluminescence performance).

As in Examples 1 to 3, the linear transmittance in the visible rays range of the pressed compacts after calcination was not lower than 3% and not higher than 50%. And it was easy to predict that a light-transmitting sintered body with a high linear transmittance not lower than 70% could be obtained by optimizing the manufacturing conditions etc.

Thus obtained were light-transmitting sintered bodies (light-transmitting fluorescent sintered bodies) formed of a compound of the composition formula $Ca(Y_{0.9}Eu_{0.1})_2O_4$.

With the compounds enumerated in Table 4 other than the $Ca(Y_{0.9}Eu_{0.1})_2O_4$ compound described in Example 4, too, light-transmitting sintered bodies with transmittance could be obtained.

The present invention concerns light-transmitting sintered bodies formed of compounds; it has not been found in the past that light-transmitting sintered bodies could be formed of those compounds. And the method of making light-transmitting sintered bodies is not limited to those described above, but methods other than those may be used.

Embodiment 2

Now, the embodiments of the light-emitting tube according to the present invention will be explained with reference to FIGS. 4 to 7. FIGS. 4 to 7 are vertical sectional views of light-emitting tubes 5 for metal vapor electric discharge lamps according to the present invention.

In FIGS. 4 to 7, the light-emitting tubes 5 are formed—at least in part—of the light-transmitting sintered body described in Embodiment 1 and are electronic devices that emit light 13.

In the present invention, part of or the whole of a light-emitting tube body 6 is formed of the light-transmitting sintered body described in Embodiment 1. Parts other than that (for example, a filler 9) may be made with the light-transmitting sintered body of the present invention. Among the methods of making part of the light-emitting tube body 6 with the light-transmitting sintered body according to the present invention are:

(1) Method in which the composition of the light-emitting tube body 6 is so modified as to contain the light-transmitting sintered body according to the present invention in part.

(2) Method in which the light-emitting tube body 6 is formed by connecting a plurality of sintered bodies, part of them being the light-transmitting sintered body according to the present invention.

(3) Method in which part of or the surface of the light-emitting tube body is formed of the light-transmitting sintered body according to the present invention by diffusing rare earth elements or alkaline earth metallic elements (as by thermal diffusion) in the conventional light emitting tube body (light-transmitting sintered body) formed of compounds like $Al_2O_3$ as main component.

Methods other then the above may be applied to use the light-transmitting sintered body according to the present invention in part of the light-emitting tube body 6.

Figure 4:
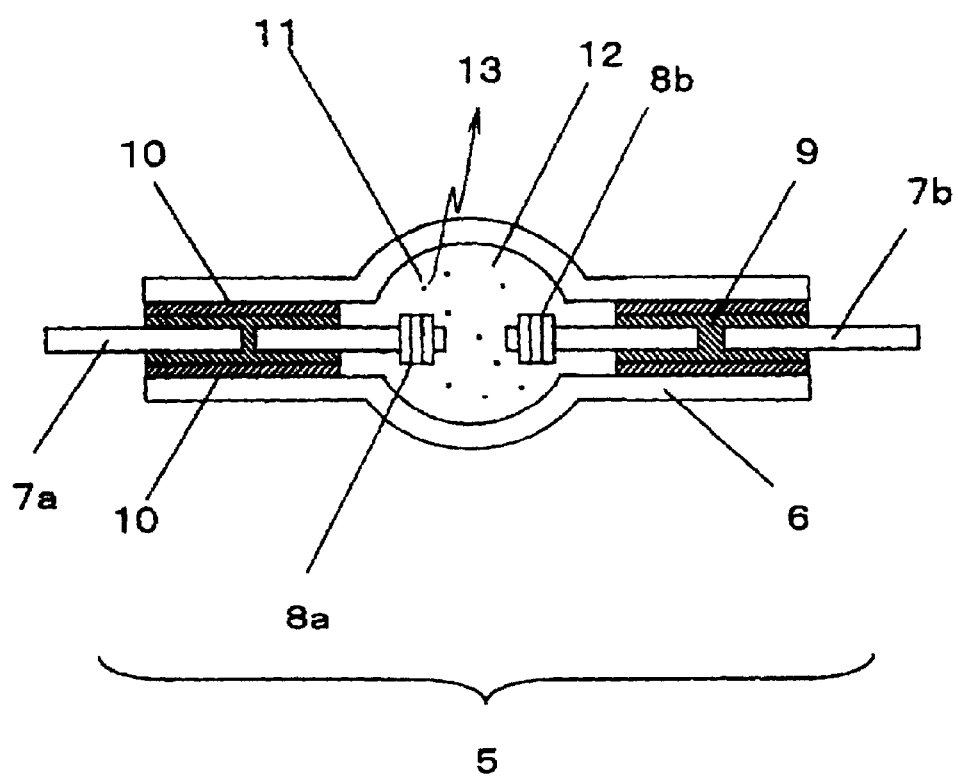
FIG. 4 is a vertical, sectional view of a circular cylindrical light-emitting tube with an enlarged central part according to the present invention.
Figure 5:
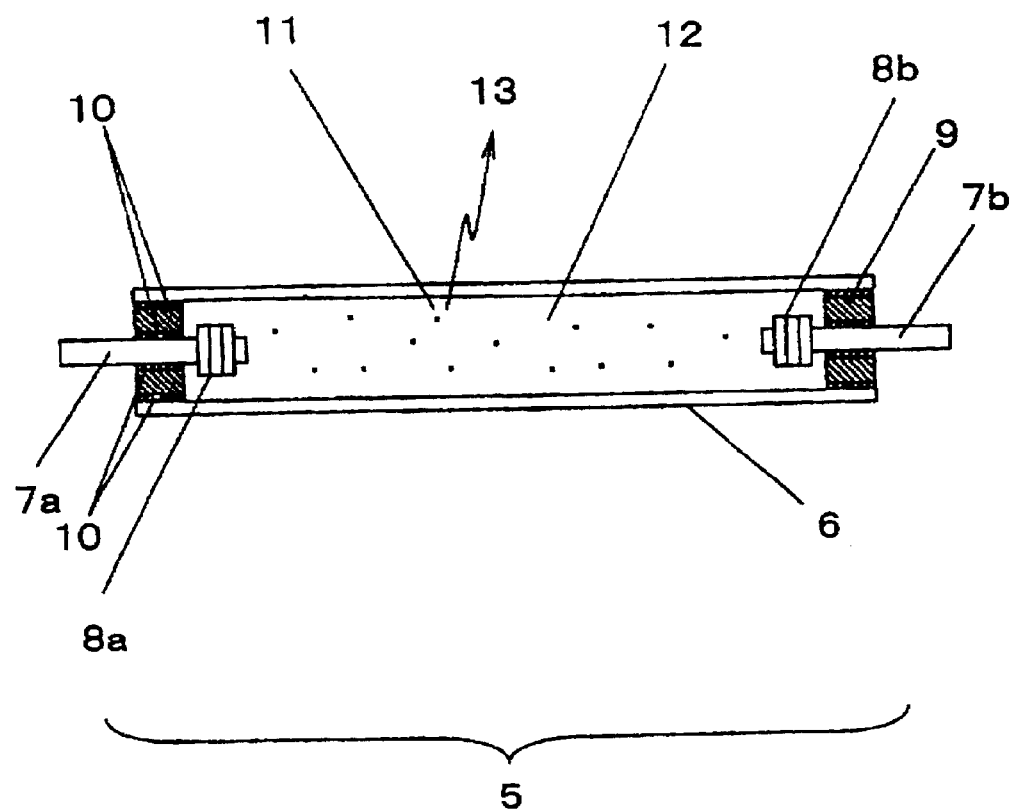
FIG. 5 is a vertical, sectional view of a circular cylindrical light-emitting tube according to the present invention.
Figure 6:
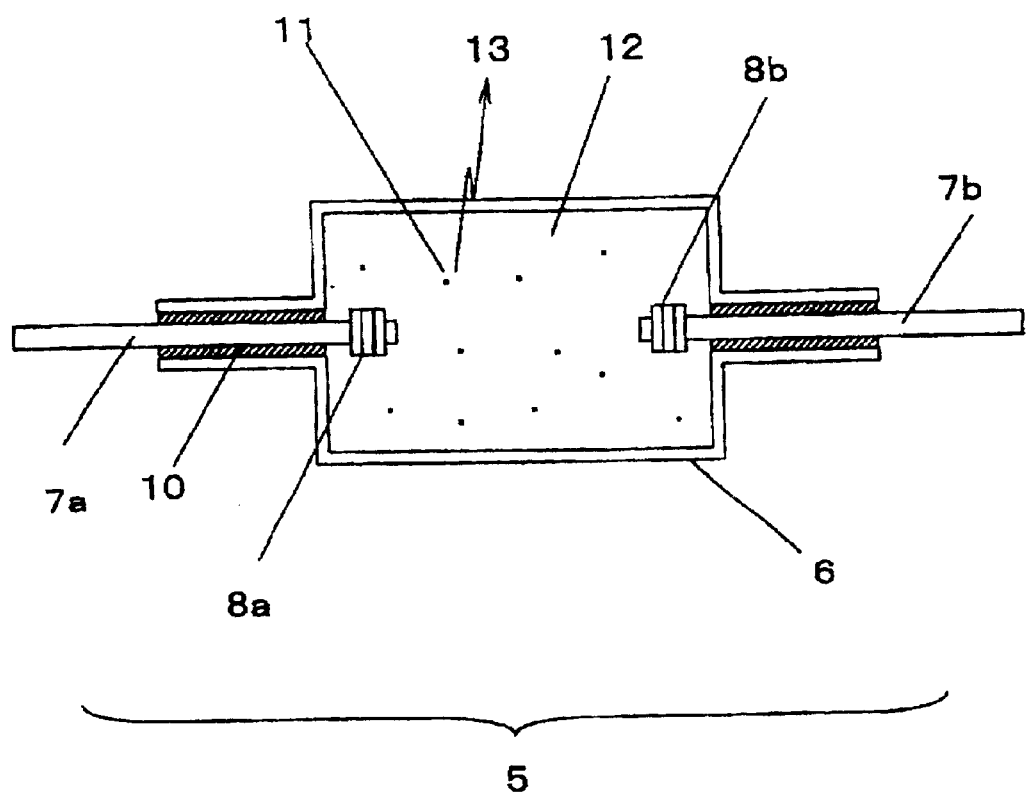
FIG. 6 is a vertical, sectional view of a light-emitting tube made up of a plurality of circular cylinders different in outside and inside diameter according to the present invention.
Figure 7:
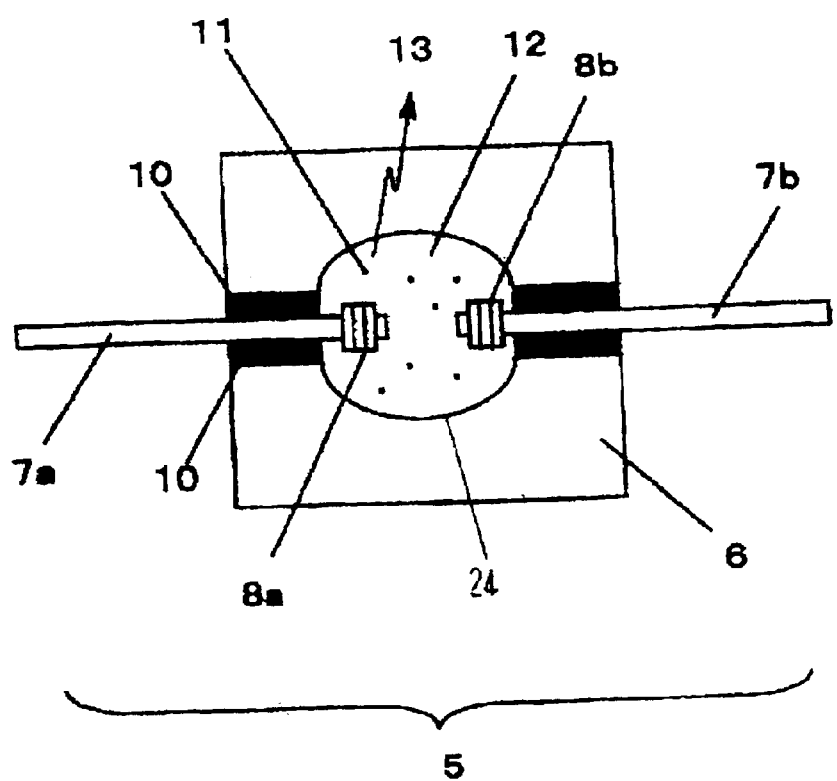
FIG. 7 is a vertical, sectional view of a box-formed light-emitting tube with an empty inside space according to the present invention.

The outside shape of the light-emitting tube body 6 is not restrictive in particular, but the following examples may be given:

(1) Circular cylindrical with an enlarged central part as shown in FIG. 4
(2) Circular cylindrical as shown in FIG. 5
(3) Circular cylinders with different outside and inside diameters as shown in FIG. 6
(4) Box-like with an empty inside space as shown in FIG. 7

Furthermore, the light-emitting tube 5 is provided with leading-in wires 7a, 7b through which power is provided. And the leading-in wires 7a, 7b have electrodes 8a, 8b at their ends as shown in FIGS. 4 to 7. Also, as shown in FIGS. 4 to 7, the electrodes 8a, 8b are so fixed within the light-emitting tube as not to come in touch with each other and so arranged that alternating current, direct current or the like is applied to the electrodes 8a, 8b through the leading-in wires 7a, 7b to cause discharging between the electrodes. (In FIG. 4, in this connection, an electric conductive filler (metallic molybdenum foil or cermet) is placed between the separated leading-wires, because the adhesion between the light-emitting tube body 6 (ceramics) and the leading-in wires 7a, 7b are poor.)

But the arrangements of the electrodes 8a, 8b are not limited to the constructions in FIGS. 4 to 7, but any arrangements will do if they serve as electrodes that can discharge.

In FIGS. 4 and 5, the filler 9 is to block the light-emitting tube body 6 where the leading-in wires 7a, 7b are embedded (FIG. 4) or led in (FIG. 5).

The material for the filler 9 is not limited, but the preferred material examples include $Al_2O_3$-Mo type sintered material, sintered material of an inorganic compound and sintered material of a mixture of metal and the inorganic compound.

The method of sealing the light-emitting tube body 6 is not restrictive, but the following examples may be cited: sealing the filler 9 and the leading-in wires 7a, 7b using a sealer 10 such as glass frit (FIGS. 4, 5), blocking between the leading-in wires 7a, 7b and the light-emitting tube body 6 (FIGS. 6, 7). In the method shown in FIGS. 6, 7, the use of the filler 9 may be omitted.

In FIGS. 4 to 7, a luminescent body 11 serves to cause the light-emitting tube 5 to emit light. The luminescent material 11 is prepared of such metals as mercury and sodium; solid sulfur; metallic halides (metallic halides of rare earth elements such as $DyI_3$, $NdI_3$, $HoI_3$ and $LuI_3$; alkali metallic halides such as LiI, NaI and KI; metallic halides such as TlI and InI. The luminescent material 11 is enclosed in the closed light-emitting tube body 6.

The light-emitting tube body 6 encloses a dischargeable discharge gas 12 (shown as blank) such as inert gases (Ar, for example) and is kept under a specific pressure so that desired discharging may take place.

The light-emitting tube according to the present invention described in Embodiment 1 is characterized in that light-transmitting sintered body described in Embodiment 1 is used at least in part therein. Therefore, it will be sufficient if the light-emitting tube 5 is formed using the light-transmitting sintered body described in Embodiment 1, and no restriction is imposed on the form, construction, manufacturing method etc.

For example, if two board-formed light-transmitting sintered bodies, each provided with a recess 2, are put together as shown in FIG. 7, a closed container with a hollow (especially small closed containers with a volume of not larger than 1 $cm^3$) defined by the recesses 24 can be made. And if the container is provided with the electrodes 8a, 8b and the luminescent material 11 and filled with the discharge gas 12, a light-emitting tube 5 can be obtained. The light-emitting tube 5 according to the present invention may be made that way.

Next, the operation of the light-emitting tube 5 will be explained. If a specific voltage (alternating current, direct current, direct pulse, alternating pulse, high frequency alternating current or the like) is applied between the electrodes 8a, 8b, the discharge gas 12 enclosed in the light-emitting tube 5 discharges and the luminescent material 11 evaporates in the discharge space and emits light. Since the light-emitting tube 5 is made with the light-transmitting sintered body (including light-transmitting ceramics) at least in part, the light 13 (discharge light: visible rays, infrared rays, ultraviolet rays) of the luminescent material 11 pass through the light-transmitting sintered body and radiates out of the light-emitting tube 5. That is, the light-emitting tube 5 emits light.

The power to be applied to the light-emitting tube 5 is not limited in particular, but an example is power not lower than 10 W and not higher than 5 kW.

Next, the control of the emitting light color of the light-emitting tube 5 will be explained concretely. For example, it is possible to provide a light-emitting tube 5 that absorbs ultraviolet rays and emits reddish light, that is, a light-emitting tube that emits reddish light. The light-emitting tube 5 is constructed using a light-transmitting fluorescent sintered body (for example, a light-transmitting fluorescent sintered body formed using a fluorescent substance with at least $Eu^{3+}$ion as luminescence center) that can convert ultraviolet rays into reddish light.

Also, if formed of a light-transmitting fluorescent sintered body (for example, a light-transmitting fluorescent sintered body formed using a fluorescent substance with at least $Tb^{3+}$ion as luminescence center) that can convert ultraviolet rays into greenish light, the light-emitting tube 5 absorbs ultraviolet rays and emits greenish light. That is, it is possible to provide a light-emitting tube 5 that emits greenish light.

Furthermore, if formed of a light-transmitting fluorescent sintered body (for example, a light-transmitting fluorescent sintered body formed using a fluorescent substance with at least $Ce^{3+}$ion as luminescence center) that can convert ultraviolet rays into greenish light, the light-emitting tube 5 absorbs ultraviolet rays and emits bluish light. That is, it is possible to provide a light-emitting tube 5 that emits bluish light.

As set forth above, the light-emitting tube according to the present invention is constructed with a light-transmitting sintered body formed using a light-transmitting sintered body material not known before. And therefore, the scope of manufacturing conditions for the light-emitting tube can be enlarged, and it is expected that techniques will be developed that permits the making of light-emitting tubes by different methods under different conditions.

It is also possible to design light-emitting tubes different in shape from the prior art utilizing the features of the light-transmitting sintered body to be used.

The problem with the prior art light-emitting tube is devitrification, and now the choice of materials can be widened, opening the possibility of solving the problem.

It is also noted that in the light-emitting tube 5 constructed with the light-transmitting fluorescent sintered body according to the present invention, the ultraviolet rays occurring in the tube is converted into visible rays which are emitted out of the light-emitting tube. That is, the ultraviolet rays can be made good use of, and the color of light emitted from the light-emitting tube can be regulated specifically, and the luminous flux of the light-emitting tube can be raised.

Embodiment 3

Figure 8:
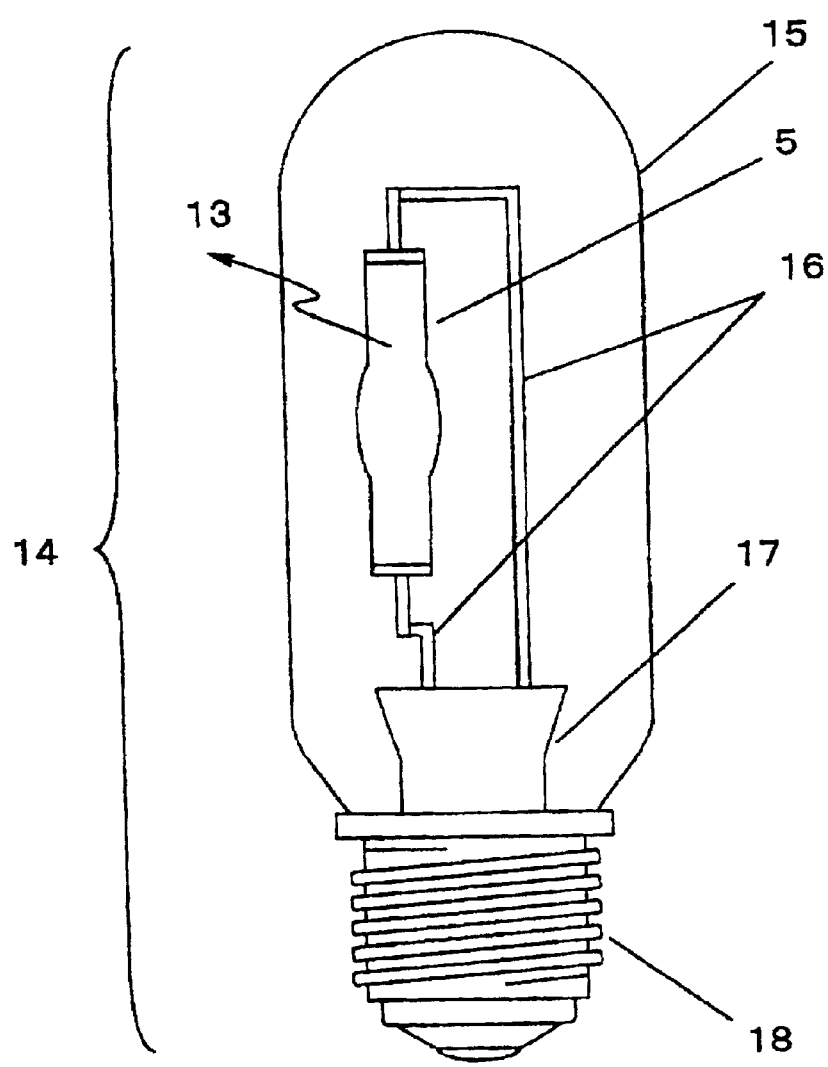
FIG. 8 is a vertical, sectional view of a first example of the electric discharge lamp according to the present invention.
Figure 9:
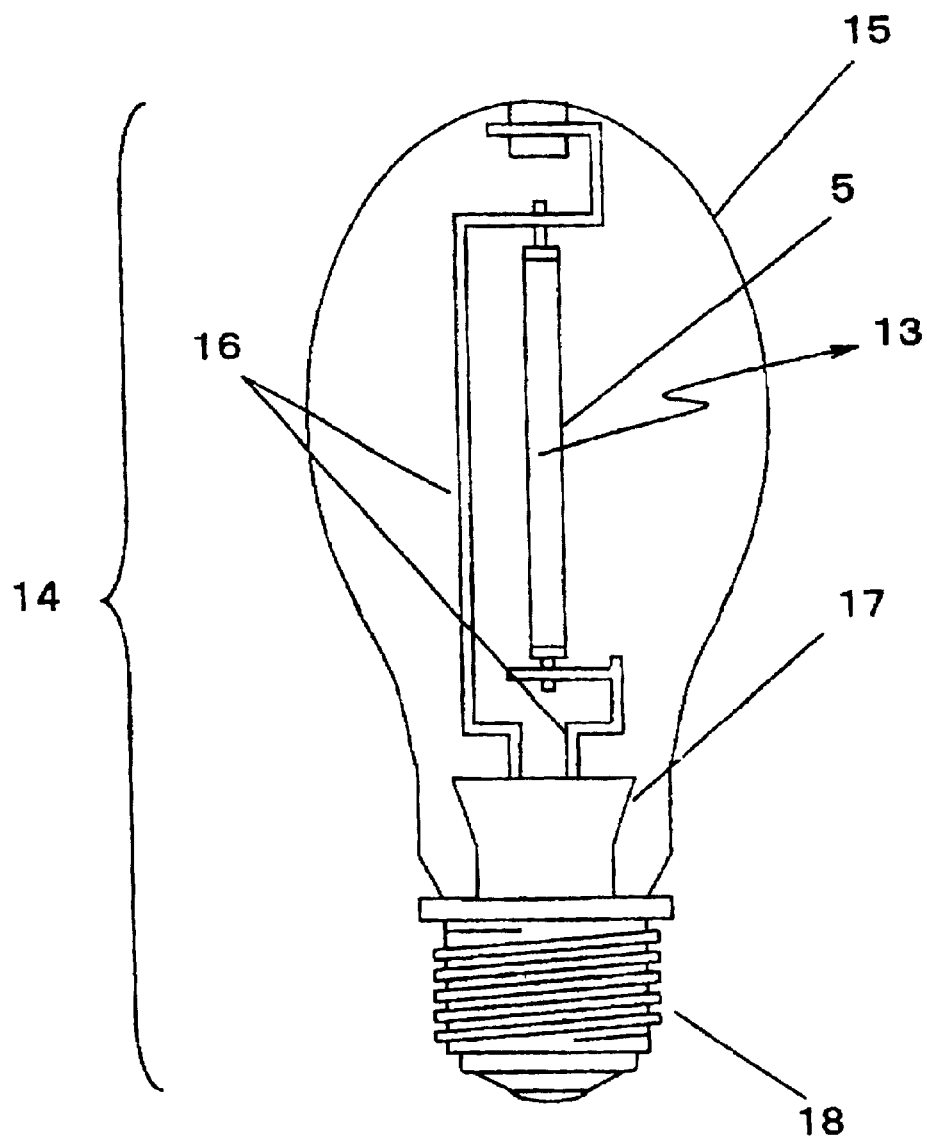
FIG. 9 is a vertical, sectional view of a second example of the electric discharge lamp according to the present invention.
Figure 10:
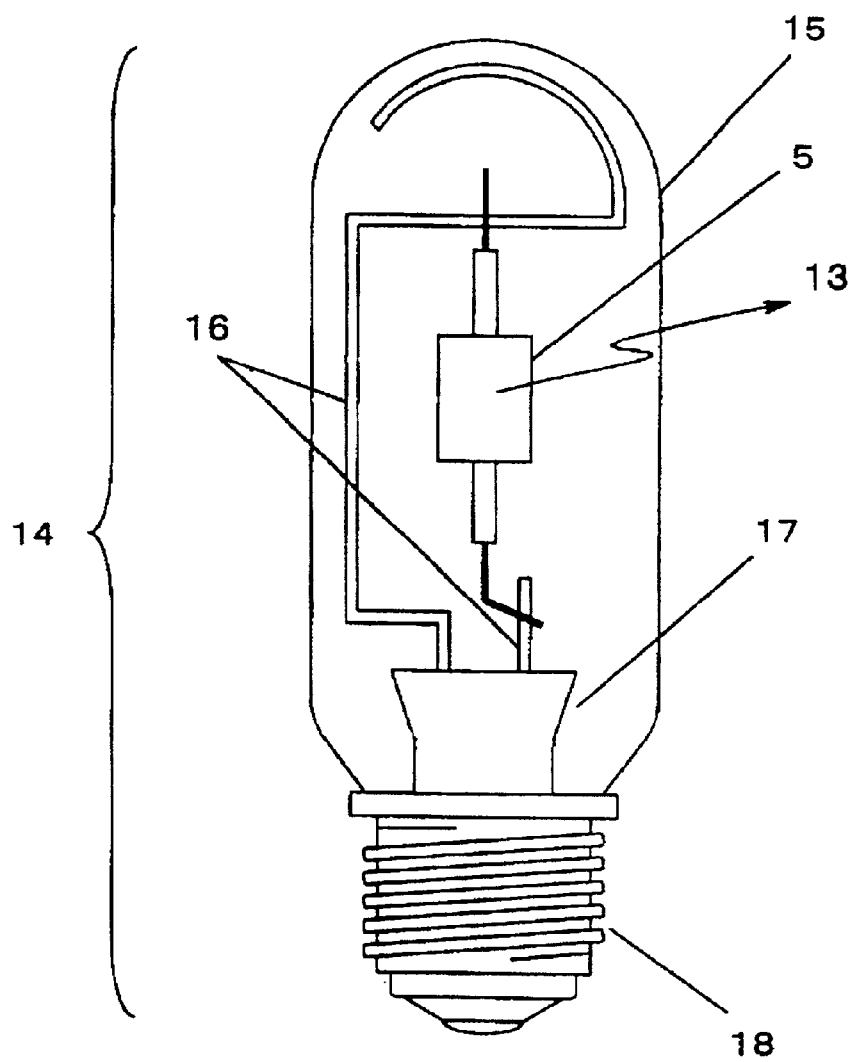
FIG. 10 is a vertical, sectional view of a third example of the electric discharge lamp according to the present invention.

Now, the embodiments of the electric discharge lamp 14 will be explained with reference to FIGS. 8 to 10. FIGS. 8 to 10 are vertical sectional views of electric discharge lamps 14.

The light-emitting tubes 5 in FIGS. 8 to 10 are the light-emitting tubes to produce light 13 from the electric discharge lamp and are formed of the light-emitting tube 5 described in Embodiment 2.

Outer tubes 15 in FIGS. 8 to 10 are enclosures made of a transparent material like glass to protect the light-emitting tube 5 and a supporter 16.

The shape of the outer tube 15 is not limited to those in FIGS. 8 to 10. The shape may be other than those. The atmosphere in the outer tube 15 is not restrictive in particular. Depending on the use of the electric discharge lamp, the atmosphere may be selected from among the atmospheric air, inert gas atmosphere, and nitrogen atmosphere. And they may be reduced pressure atmosphere, vacuum atmospheres etc.

Depending on the use of the outer tube 15, the inner wall or outer wall of the outer tube 15 may be coated with a fluorescent substance to convert ultraviolet rays into visible rays (not shown), a diffusion material to diffuse the light emitted from the light-emitting tube 5 (for example, powder of inorganic materials like alumina (not shown)), and a reflection material to distribute the light from the light-emitting tube 5 in a specific direction (for example, metallic deposition film (not shown)).

The supporter 16 is to support the light-emitting tube 5 and made of a stainless steel stick. It is desirable that the supporter 16 also serves as power provider to supply power to the light-emitting tube 5. The supporter 16 may be formed of metallic wire or metallic plate such as copper wire, platinum plate, for example.

A stem 17 is to fix the supporter 16 and is made of such a material as glass. The supporter 16 is fixed in some other way to omit the stem 17. The material of the stem 17 is not restrictive. Any material will do as long as it is a material that does not cause short circuit.

The base 18 is to clamp the electric discharge lamp 14 to illumination equipment as by screwing in and to supply electricity to the electric discharge lamp 14.

Means for clamping the electric discharge lamp 14 to illumination equipment and means for supplying electricity to the electric discharge lamp 14 are not limited to those. It is possible to clamp the electric discharge lamp to illumination equipment and supply electricity to the lamp as by sliding or turning means or the like, for example.

If electricity is supplied to the electric discharge lamp 14 as described above, the light-emitting tube 5 described in Embodiment 2 emits visible rays (the light 13) which are then radiated through the outer tube 15.

In the electric discharge lamp 14 according to the present invention, the light-transmitting sintered body forming the light-emitting tube 5 is made of materials different from the prior art materials. Therefore, it is possible to design light-emitting tubes different in shape from the prior art and also to provide light-emitting tubes emitting lights different in color from the prior art. That is, the possibility is opened that the designing scope of shapes of the electric discharge lamp 14 can be widened and that the electric discharge lamps can be obtained that emit lights unknown in the past.

Especially the electric discharge lamp using a light-emitting tube formed of the above-mentioned light-transmitting sintered body can convert into visible rays ultraviolet rays from the light-emitting tube that have not been made good use of in the past, whereby the luminous flux can be raised, since an light-emitting tube is used in which a fluorescent substance that emits light with high efficiency under irradiation with ultraviolet rays with a wave-length of 140 to 280 nm is utilized at least in part. Furthermore, it is possible to add to the light of the electric discharge lamp a light selected from among the visible rays (for example, blue, green, red light) and thus control the light emitted from the electric discharge lamp by properly selecting a fluorescent substance.

As set forth above, the electric discharge lamp 14 according to the present invention is characterized in that the light-emitting tube 5 of Embodiment 2 formed by using the light-transmitting sintered body described in Embodiment 1 at least in part is utilized.

Therefore, it is only required that the light-emitting tube formed using the light-transmitting sintered body described in Embodiment 1 is used, and the construction of the electric discharge lamp is not limited to those described above.

The electric discharge lamps according to the present invention include a high pressure sodium lamp, metal halide lamp, mercury lamp and color HID lamp.

Figure 11:
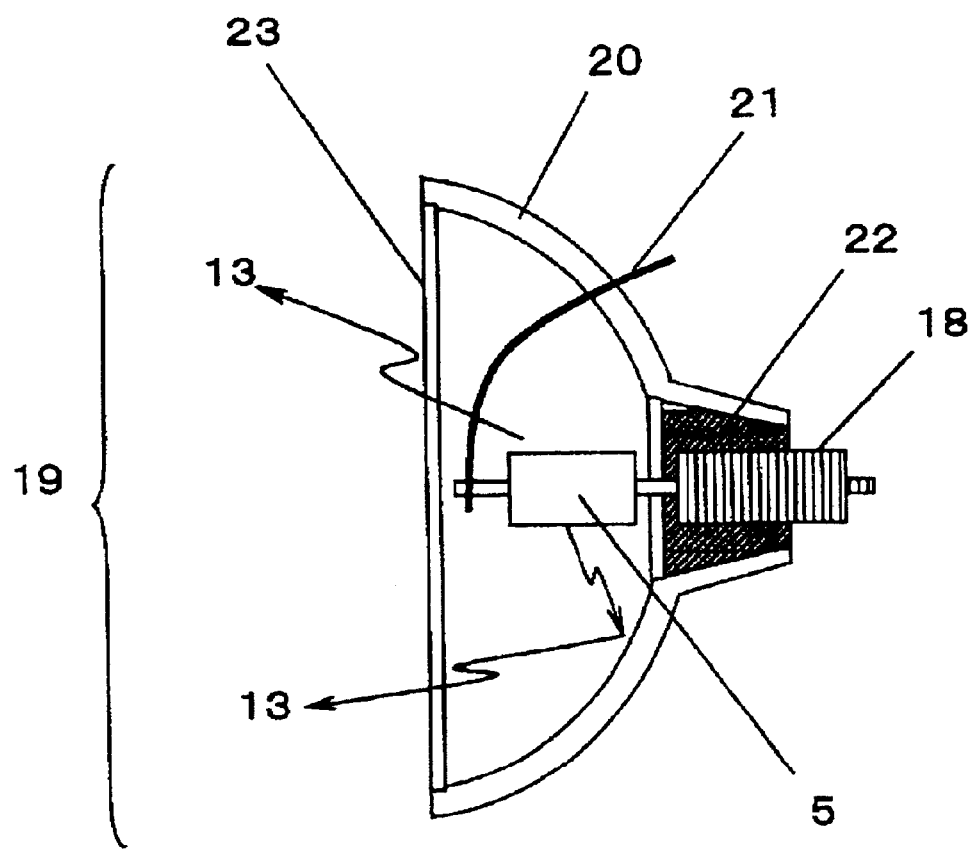
FIG. 11 is a vertical, sectional view of an electric discharge lamp with a reflector according to the present invention.

An electric discharge lamp different in construction from those described above will be explained with reference to FIG. 11. FIG. 11 is a vertical sectional view of an electric discharge lamp with a reflector according to the present invention.

This electric discharge lamp is a reflector-equipped electric discharge lamp 19 formed using the light-emitting tube 5 described in Embodiment 2 (FIGS. 4–7). This electric discharge lamp finds wide uses as back light for liquid crystal projectors, for local illumination and as head lamp for motor vehicles, aircraft, ships and boats and others.

A reflector 20 is a reflector so designed as to reflect and radiate the visible rays emitted from the light-emitting tube 5 in a specific direction. The surface the light hits is coated with a metallic film (for example, aluminum metallized film), a laminated film or the like so that the light reflects on the surface.

Infrared rays are emitted from the light-emitting tube 5 at the same time and are radiated from the reflector-equipped electric discharge lamp as heat rays. To curb the radiation of infrared rays, it is desirable that the reflector 20 is an infrared transmission mirror (for example, the reflector called the dichroic mirror that lets through 80 to 90% of infrared rays).

A conductor 21 is an electric conductor to supply electricity together with the base 18, and is formed of metallic wires such as copper wire and platinum wire.

The base 18 is to fix the reflector-equipped electric discharge lamp 19 in illumination equipment and, together with the conductor 21, supplies electricity to the reflector-equipped electric discharge lamp 19. The base 18 is of the screwed type, but as mentioned earlier, the present invention is not limited to this type.

Cement 22 is set to a rigid mass with the base 18 put within the cement 22. But the present invention relates to an electric discharge lamp equipped with the light-emitting tube 5 and the reflector 20, and even if no cement is used, the object is achieved if the electric discharge lamp is provided with the light-emitting tube 5 and the reflector 20.

A front plate 23 is to protect the electric discharge lamp from being damaged by an impact from outside and is made of a transparent material such as transparent sheet glass or plastic sheet. The front plate 23 may be so made as to serve as a diffusing plate to diffuse the light from the electric discharge lamp, a condensing lens to condense the light from the electric discharge lamp. The front plate 23 may be omitted. The diffusing plate and the lens (both not shown) may be placed separately from the front plate 23.

The operation and effect of the reflector-equipped electric discharge lamp 19 is the same as those of the electric discharge lamp described earlier and will not be explained.

It is noted that the reflector-equipped electric discharge lamp 19 according to the present invention may be of other constructions than those described above, as long as the reflector-equipped electric discharge lamp 19 is provided with the light-emitting tube 5 and the reflector 20.

What is claimed is:

1. A light-transmitting ceramic compact comprising a compound as main component, said compound having a magnetoplumbite structure.

2. A light-transmitting ceramic compact comprising a compound as main component except for aluminum oxide, said compound having a β-alumina structure.

3. A light-transmitting sintered body comprising a compound as main component, said compound containing rare earth elements with an ionic valence of two, aluminum element and oxygen element as main components.

4. The light-transmitting ceramic compact as defined in claim 1 which is an aluminum compound.

5. The light-transmitting ceramic compact as defined in claim 1 or 2 which contains alkaline rare earth elements as main components.

6. The light-transmitting ceramic compact as defined in claim 1 or 2 which is an oxide.

7. The light-transmitting ceramic compact as defined in claim 1 which comprises an compound of the composition formula $\alpha_{(1)}\delta_{(1)}Al_xO_y$ as main component where $\alpha_{(1)}$ represents at least one element selected from the group consisting of Sc, Y, La, Ce, Pr, Nd, Sm, Eu, Gd, Tb, Dy, Ho, Er, Tm, Yb, Lu; $\delta_{(1)}$ represents at least one element selected from the group consisting of Mg, Zn, Mn; x has a value satisfying $5.5 \leq x \leq 22$, and y has a value satisfying $9.5 \leq y \leq 38$.

8. The light-transmitting ceramic compact as defined in claim 2 which comprises a compound of the composition formula $\gamma_{(2)}\delta_{(2)}Al_xO_y$ as main component where $\gamma_{(2)}$, with an ionic valence of two expressed in (II), represents at least one element selected from the group consisting of Ca, Sr, Ba, Eu(II), Sm(II), Yb(II), Dy(II) and $\delta_{(2)}$ represents at least one element selected from the group consisting of Mg, Zn, Mn and where x has a value satisfying $5.5 \leq x \leq 20$, and y has a value satisfying $8.5 \leq y \leq 34$.

9. The light-transmitting ceramic compact as defined in claim 1 or 2 which is a light-transmitting fluorescent sintered body fluorescing under irradiation with ultraviolet rays with a wave-length of not shorter than 100 nm and not longer than 380 nm.

* * * * *

UNITED STATES PATENT AND TRADEMARK OFFICE
CERTIFICATE OF CORRECTION

PATENT NO. : 6,740,262 B2
DATED : May 25, 2004
INVENTOR(S) : Shozo Oshio

It is certified that error appears in the above-identified patent and that said Letters Patent is hereby corrected as shown below:

Column 31,
Line 2, "ALKALINE RARE EARTH" should read -- ALKALINE EARTH --
Line 2, "COMPRISES AN COMPOUND" should read
-- COMPRISES A COMPOUND --

Signed and Sealed this

First Day of February, 2005

JON W. DUDAS
*Director of the United States Patent and Trademark Office*